United States Patent [19]

Rudy et al.

[11] Patent Number: 4,608,679

[45] Date of Patent: Aug. 26, 1986

[54] OPTICAL STORAGE AND RETRIEVAL DEVICE

[75] Inventors: Michael Rudy, Huntington Beach; Paul Cary; Arthur A. Roth, both of Santa Ana, all of Calif.

[73] Assignee: Filenet Corporation, Costa Mesa, Calif.

[21] Appl. No.: 629,693

[22] Filed: Jul. 11, 1984

[51] Int. Cl.$^4$ .......................... G11B 5/48; G11B 17/00
[52] U.S. Cl. ........................................ 369/36; 369/34; 369/39
[58] Field of Search .................... 369/34, 36, 37, 38, 369/39

[56] References Cited

U.S. PATENT DOCUMENTS

| | | | |
|---|---|---|---|
| 2,810,582 | 10/1957 | Kuntz | 369/39 |
| 4,451,912 | 5/1984 | Kirchner | 369/77.2 |
| 4,502,133 | 2/1985 | Siryj et al. | 369/34 |

Primary Examiner—Steven L. Stephan
Attorney, Agent, or Firm—Knobbe, Martens, Olson & Bear

[57] ABSTRACT

In a system for storing and retrieving cartridges, a plurality of cartridges are placed in plural slots of diverse location and orientation. A rotatable carriage contains a first and second gripping mechanism, either of which extends to engage and slidably retract an cartridge from a first storage slot into the carriage. The carriage can rotate the cartridge to the orientation of a second slot. A vertical and horizontal transport mechanism moves the carriage to the second slot whereupon the position and orientation of the carriage with respect to the second slot is verified. The gripping mechanism then retractably extends and releases the cartridge into the second slot, whereupon the gripping mechanism retracts into the carriage. The use of a first and second gripping mechanism allows expedited manipulation and transportation of the cartridges. Sensors verify the alignment of the carriage with respect to the various slots.

25 Claims, 24 Drawing Figures

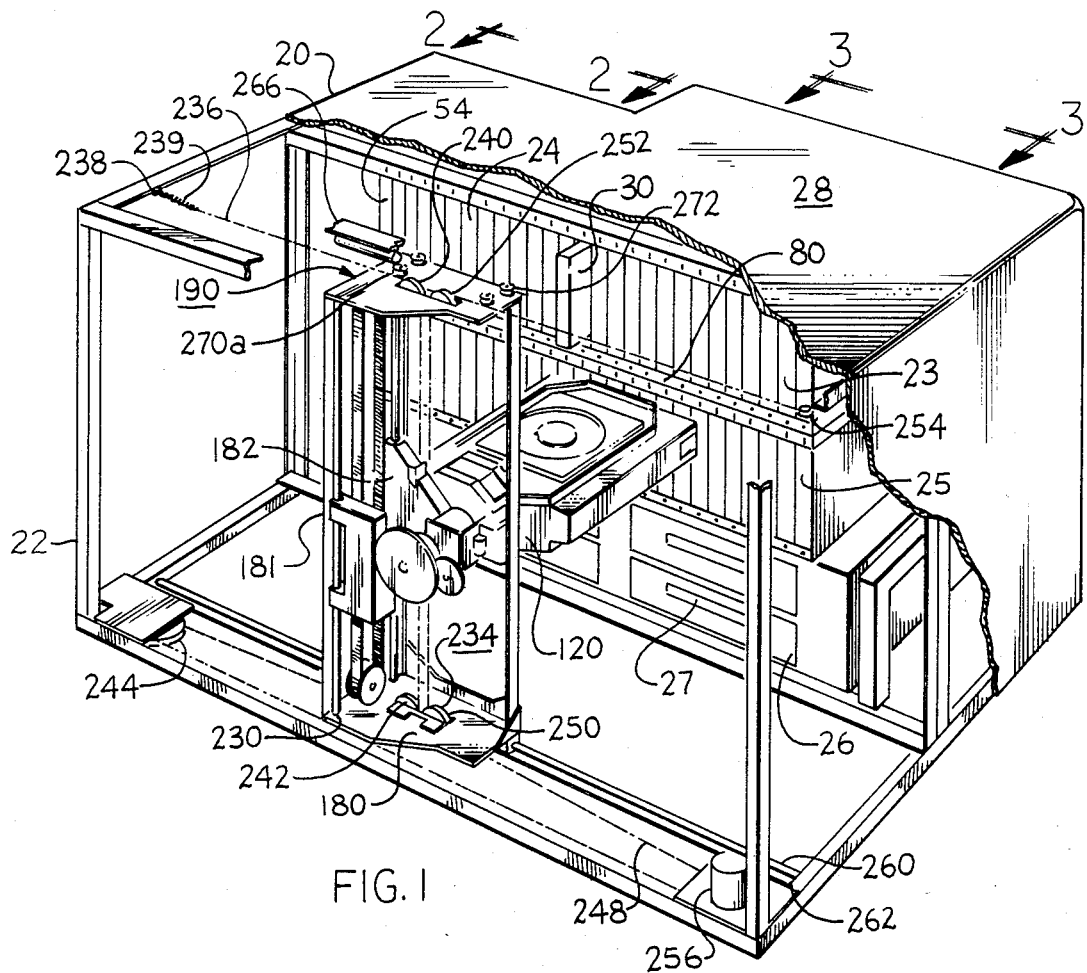
FIG. 1
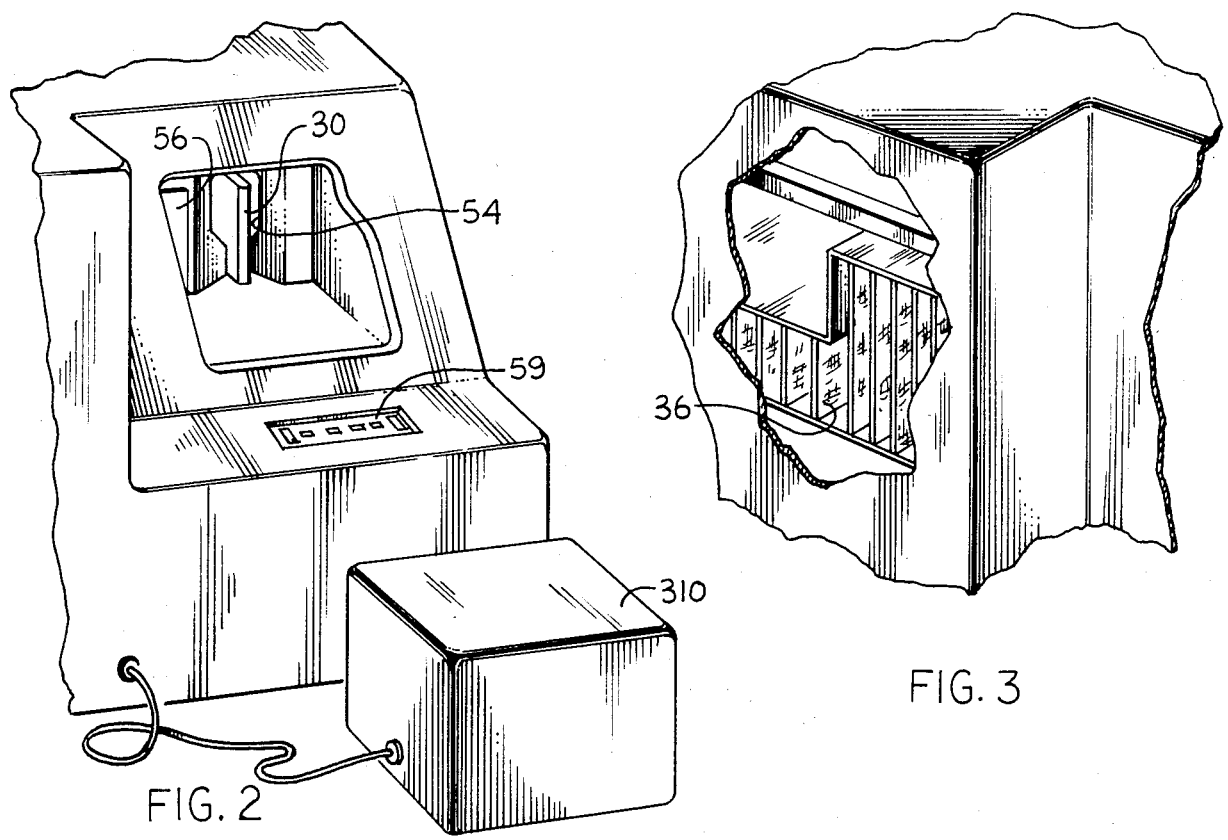
FIG. 2
FIG. 3

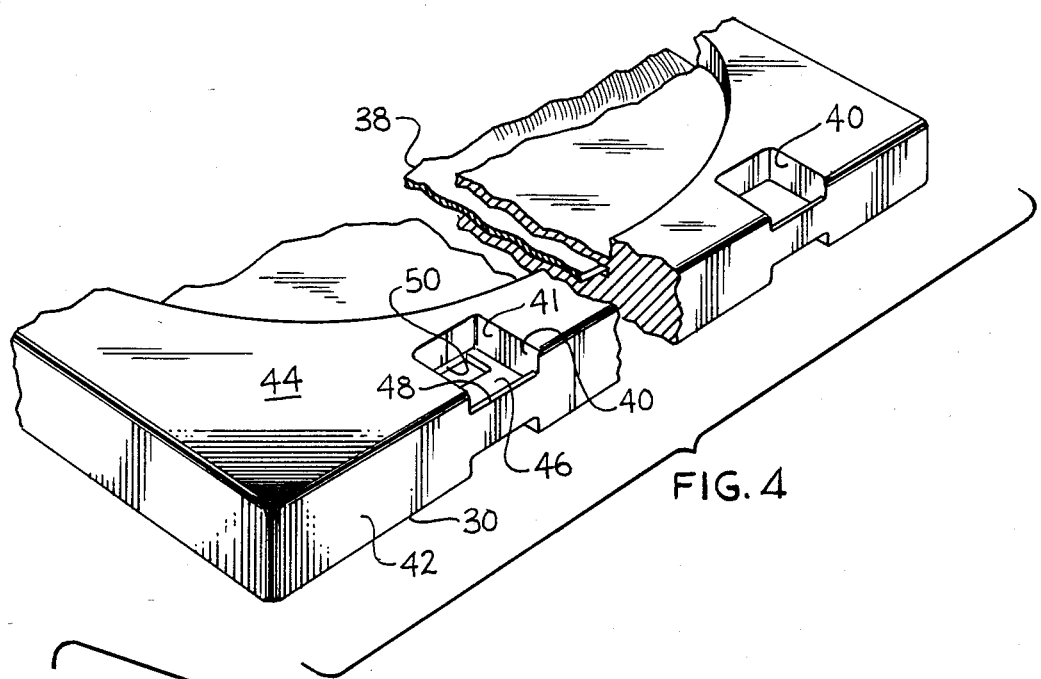
FIG. 4
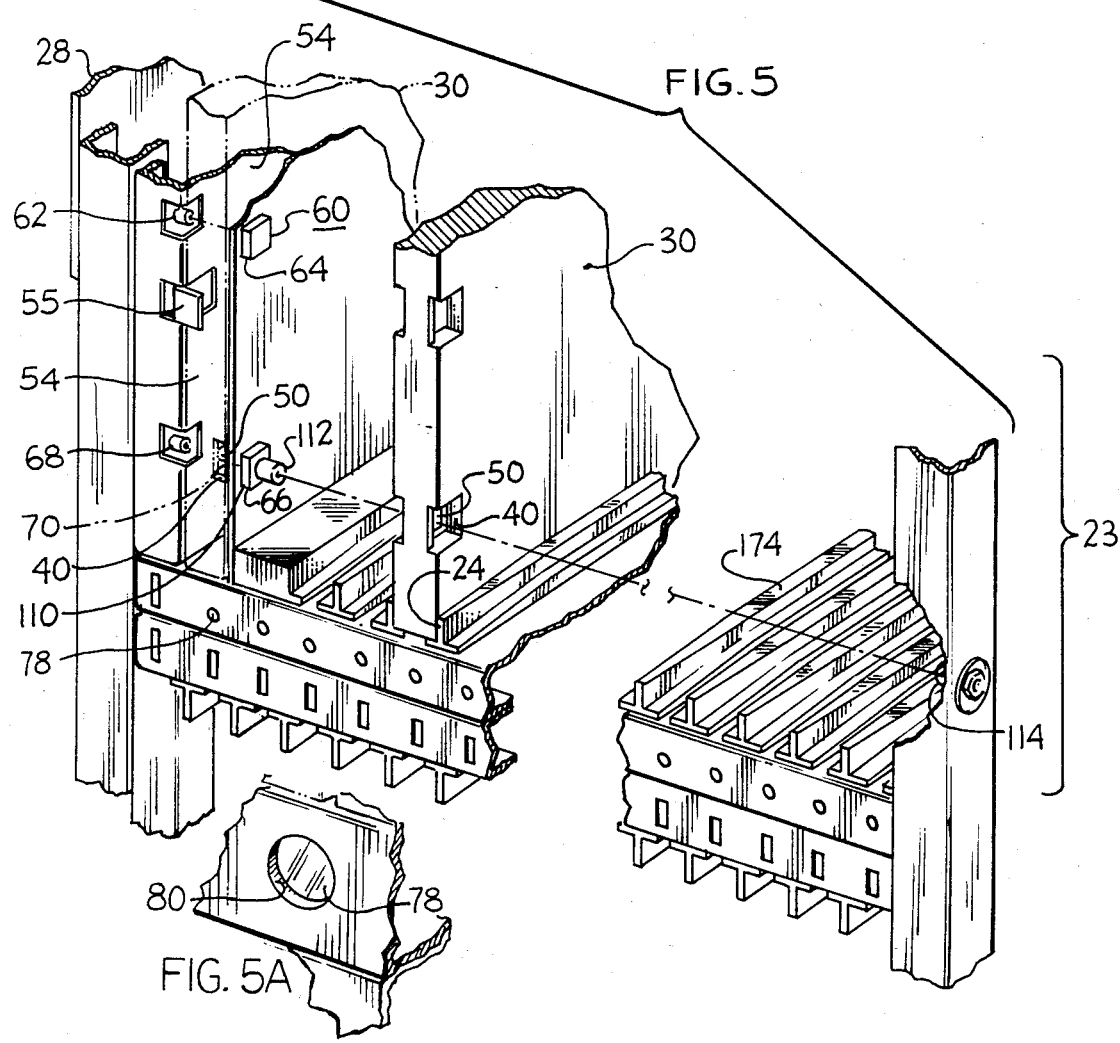
FIG. 5
FIG. 5A

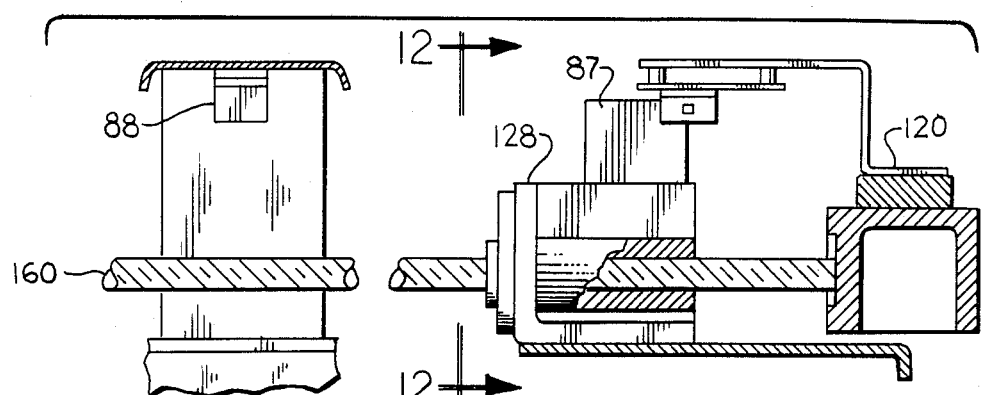
FIG. 11
FIG. 12
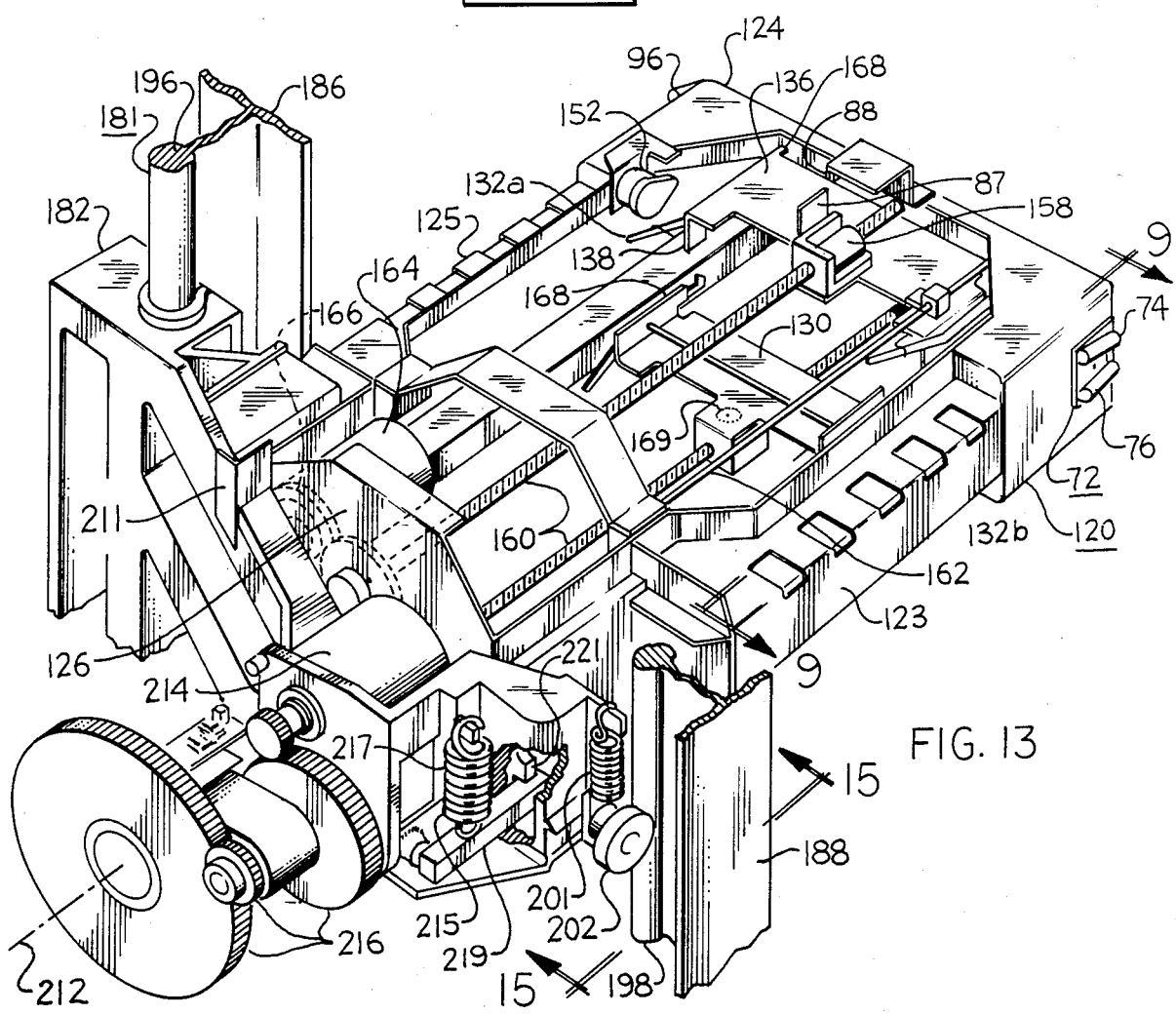
FIG. 13

OPTICAL STORAGE AND RETRIEVAL DEVICE

This invention relates generally to the field of storage and retrieval devices, and in particular, to the storage and retrieval of optical disk cartridges.

The modern need to retain and manipulate large volumes of records and other information has resulted in a need for information storage devices. File cabinets previously provided this storage capacity when the information was first stored on sheets of paper, and later reduced and stored on sheets of microfiche. Even though the microfiche provided a vast improvement over the storage capacity of paper, this improvement is insufficient for the present and envisioned needs for information storage capacity.

In order to increase the storage capacity, many business entities have resorted to computer storage, whereby the information is stored on electromagnetic tapes or a magnetic bubble memory. While such storage systems do provide a vast increase in the amount of information which can be stored in a given volume of space, they present other problems. For example, electromagnetic tape storage devices are subject to inadvertent erasure by exposure to a magnetic field or through wear, abrasion, or other physical damage to the electromagnetic tape. This susceptibility to loss of information often necessitates the storage of multiple copies of critical information in several localities to guard against the inadvertent destruction of the information at one of the multiple locations. The inadvertent erasure problems are ameliorated by such optical storage devices as microfiche or microfilm. These optical storage devices reduced the physical contact with the information storage device and thereby reduced the danger of physical damage resulting in loss of information. Other problems remained. For example, only a relatively small amount of information could be stored on each individual microfiche, just as a sheet of paper can only contain a relatively small amount of data. Also, an undue amount of time was consumed in locating the correct microfiche, inserting it into a microfiche reader, and then locating the correct block of information on the microfiche so that it can be used.

This limited access problem was partially overcome by using microfilm, which is a continuous strip of film wound on a spool or cylinder. Nevertheless, if the desired information was located at the end of the film, the entire spool of film had to be unwound before the desired information could be obtained. This delay in obtaining the information is often unacceptable. Finally, while the microfilm-based devices eliminated the problem of electromagnetic erasure of information, there still remained the danger of physical damage to the microfilm through wear, abrasion, tearing, and bacteriological attack on the film itself.

While the space allocated to the information storage device is always of concern, it is also important how that space is used by the storage device itself. For example, some previous microfilm storage devices using spools of microfiche resulted in equipment which was too large and bulky to fit through a standard size office doorway. Thus, it was difficult to place the data storage device in the desired locations, or to move the device if the business changed locations or rearranged the office floor plan. Additionally, such large and bulky units become difficult to ship on conventional carriers due to their large size or heavy weight.

Additionally, these prior devices presented severe problems in terms of access time to the information, as previously alluded to. For example, the microfiche might be stored in a file cabinet at a distance away from the microfiche reader, resulting in a loss of time to locate and insert the correct microfiche. If spooled microfilm or electromagnetic tape were used, a physical storage and retrieval of the microfilm or tape could result in similar problems, but with the added complexity of threading the spooled microfilm or tape into the reader. If an automated storage device was used, then the response time of the automated retrieval is important, in terms not only of locating and retrieving the correct tape, but also in terms of inserting it into a reader, threading the tape, and then unwinding the tape until the correct information storage location is located.

Prior art devices also required manual extraction and transportation of the tapes or microfiche containing the desired information. Some mechanical retrieval systems existed, but they typically required bulky storage compartments so mechanical arms would grab the tape or storage container on opposite sides of the container. Some storage retrieval devices used the weight of the object to hold the object in place during retrieval or transportation. These gravity based devices were orientation dependent, since gravity only acts downward. Additionally, the retrieval mechanism had to be strong enough to carry the weight of the tape or storage container. Finally, the storage compartment had to be sufficiently large to allow the retrieval device to fit under the tape or container so as to lift the tape or container out of the storage location.

The mechanical retrieval systems were typically bulky and heavy as they were designed to support the entire weight of the object being transported by grabbing around opposing sides of the object. The bulky size limited the retrieval speed, and also limited the number of retrieval mechanisms which could operate concurrently in a given space.

There thus exists a need for an information storage system with a quick retrieval of information, which system occupies a relatively small space and is of such size that it can be easily transported to and within an office. Additionally, the storage system desirably minimizes the possibility of loss of information through physical wear and abrasion or even exposure to electromagnetic variations.

SUMMARY OF THE INVENTION

Briefly described, the mechanism of this invention uses optical storage disks or video disks to store the information. These optical storage disks are placed in protective containers or cassettes. The cassettes in turn are placed in storage slots, with the slot location being stored in a memory device. A fast response carriage transport mechanism locates the desired cartridge, removes it from its storage slot, transports it to an optical reader, and inserts it into the reader so the information can be obtained from the disk.

The optical storage disk is similar in shape to a phonograph record, but has the information optically stored on the disk, rather than physically stored in the shape and variation of the grooves as in a phonograph record. For protection, and to facilitate handling, the optical storage disk is placed in a square cartridge which has specially designed holes or recesses at one edge of the cartridge. To manipulate the cartridge, two recesses on the same surface or side of the cartridge are grabbed by a gripping mechanism on the carriage transport mechanism.

Optical sensors detect whether the cassettes are correctly positioned in the storage slot in order to prevent inadvertent damage to the cassettes and optical storage disks by the carriage transport mechanism. Optical sensors also verify that a cartridge is located in a slot in order to verify the retrieval commands thereby eliminating the need to physically expose the cartridge and visually examine the entire storage device. Optical sensors are further used to periodically verify and update the location of each cartridge slot to insure the carriage transport mechanism always goes to the correct location. There is thus advantageously provided a non-contact verification system to insure and enhance the system performance.

In order to provide faster access to the information on the optical storage disks, the carriage transport mechanism is capable of transporting and transferring multiple cartridges at the same time. Typically, the carriage transport mechanism can handle two cartridges simultaneously, allowing one cartridge to be rapidly replaced by another cartridge. Since the gripping mechanisms grab the cartridges on only one surface, the two gripping mechanisms and their cartridges can be placed in a compact space, thereby minimizing weight and further improving the response time. There is thus advantageously provided a means of quickly manipulating the cartridge.

The nature of the optical storage disks makes it desirable to store these disks vertically, but to read and obtain the information from the disks while they are in a horizontal position. Thus, the carriage transport mechanism can rotate from the vertical cartridge retrieval and storage position, to the horizontal position in which the disk must be inserted into and read by an optical scanner. This rotational capability also allows the carriage transport mechanism to be correctly aligned with the cartridge storage slots and optical scanners so as to minimize the possibility of damage to the cartridge or the optical storage disk contained in the cartridge. There is thus advantageously provided an accurate alignment and positioning means. To facilitate shipping and movement, the device is separable into two halves which may be joined at the site of use. One-half contains the cassette storage and reader units, while the second half contains the carriage transport mechanism. A three-point attachment between the two halves provides for a planar, non-distorting attachment. Adjustable legs on each half of the frame allow for leveling of the device to accommodate distortions in the floor. There is thus advantageously provided an optical storage device of such size that it can be moved and transported by conventional means through standard sized office doorways.

An input/output slot which is externally accessible is used to insert or remove optical storage cartridges from the optical storage and retrieval unit. A cartridge can be inserted into the slot where the carriage transport mechanism will retrieve the cartridge for subsequent disposition. In a similar manner, cartridges can be removed from the optical storage and retrieval unit. There is thus advantageously provided a means of easily removing or accessing the cartridges stored in the device of this invention.

DESCRIPTION OF THE DRAWINGS

FIG. 1 is a partially sectioned, perspective view of the optical storage and retrieval system of this invention;

FIG. 2 is a partially sectioned, perspective view taken along 2—2 of FIG. 1 showing the input/output slot and remote computer;

FIG. 3 is a partially sectioned, perspective view taken along 3—3 of FIG. 1, showing the computer location;

FIG. 4 is a partially sectioned perspective view of a cartridge, its enclosed optical disk, and the gripping slots of this invention;

FIG. 5 is a perspective view showing the storage alignment detector of this invention;

FIG. 5A is a perspective view of an alignment target taken from FIG. 5;

FIG. 11 is a partially sectioned, elevational view showing the limit sensors on the carriage of this invention;

FIG. 12 is an elevational view taken along 12—12 of FIG. 11 showing a limit sensor of this invention;

FIG. 13 is a perspective view of the carriage of this invention;

DETAILED DESCRIPTION OF THE PREFERRED EMBODIMENT

Figure 6:
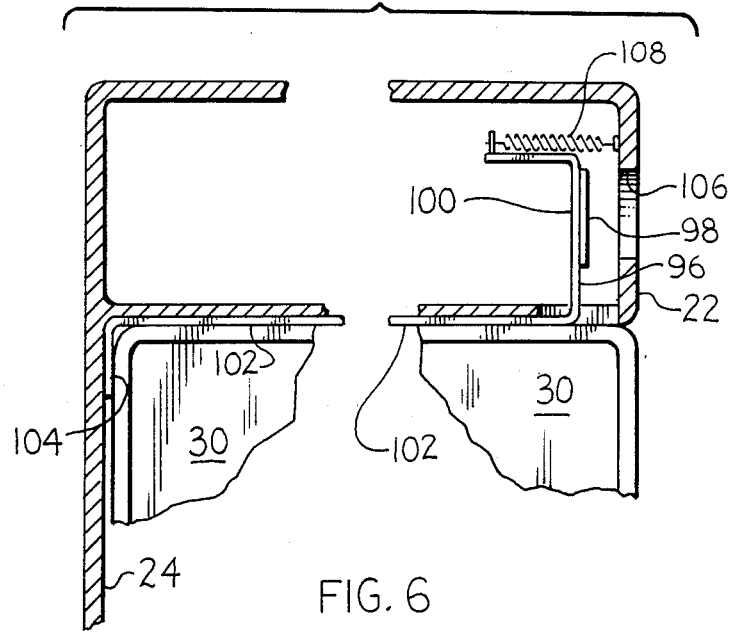
FIG. 6 is a partially sectioned elevational view of the reflective portion of the slot full sensor of this invention.

FIG. 1 shows an optical storage and retrieval system 20 of this invention. An overview shows a generally rectangular frame 22, supporting upper and lower rows or racks 23 and 25 of cartridge storage slots 24 which are located on one-half of the frame 22. Below the storage slots 24 are located optical scanners 26, which read or write the information on optical storage disks 38 (FIG. 4). The disks 38 are contained in cartridges 30 (FIG. 4) for protection and ease of handling.

On the other half of the frame 22 is located a carriage transport mechanism 180 which is a two axis transportation system that positions a carriage 120 in front of the appropriate cartridge storage slot 24, an input/output slot 54, or an optical scanner input/output slot 27 on the optical scanner 26. The carriage 120 is rotatably mounted on a carriage transport mechanism 180 so that it can rotate from a vertical orientation aligned with the cartridge storage slots 24, to a horizontal orientation aligned with the optical scanner input/output slot 27 on the optical scanner 26. In operation, the carriage transport mechanism 180 positions the carriage 120 in front of a cartridge storage slot 24 so that a cartridge 30 can be retrieved or inserted at the storage slot 24 and transported to an optical scanner 26, the input/output slot 54 or another storage slot 24.

Normally, the cartridges 30 are enclosed by the housing 28 on frame 22 and are thus accessible only to the carriage 120. The housing 28 can be entered by access doors (not shown) to gain access to the interior of the housing 28 for servicing and maintenance. Cartridges 30 can be inserted or removed from the optical storage and retrieval system 20 by inserting or removing cartridges 30 from an input/output slot 54 which is externally accessible as shown in FIG. 2. Thus, an operator may insert or remove a cartridge 30 from the input/output slot 54 where the cartridge 30 could then be retrieved and handled by the carriage 120 on the carriage transport mechanism 180 (FIG. 1). A computer 36 (FIG. 3) controls the manipulation of the cartridge 30 by the optical storage and retrieval system 20.

FIG. 4 shows the construction of a cartridge 30 and the enclosed optical storage disk 38 which is a thin, circular disk, approximately 0.12 inches thick by 12 inches in diameter, although the dimensions can vary. The optical storage disks 38 are constructed of diverse materials, but are typically constructed of tempered glass. Data is stored and retrieved from these optical storage disks 38 by use of laser imprinters and laser readers such as optical scanners 26 (FIG. 1). Data can be stored on one or both sides of these optical storage disks 38, with the present storage capacity being approximately 1,000 megabytes on a single side of a twelve inch disk.

The optical storage disks 38 are typically contained in protective cartridges 30. The cartridges 30 generally have a square side whose largest dimension is just large enough to enclose the diameter of the optical storage disk 38. The cartridges 30 are approximately one inch thick and 13 inches per side. The cartridges 30 weigh approximately 3.5 pounds each, including the optical disk 38.

Gripping slots 40 are placed in one edge of the cartridge 30 in order to allow the cartridge 30 to be grasped and moved by mechanical means such as contained in the carriage 120 (FIG. 1). These gripping slots 40 may be of diverse shape and location, but preferably take the form of square recesses 41 which open onto the edge 42 of the cartridge 30, and also onto the adjacent side 44 of the cartridge 30. The gripping slots 40 are not of sufficient depth to form a hole through the thickness of the cartridge 30.

There are preferably four gripping slots 40 in each cartridge 30. The gripping slots 40 are located in adjacent but opposing pairs with the gripping slots 40 of each pair opening onto the same edge 42 of the cartridge 30, but opening onto opposing sides 44 of the cartridge 30. All four gripping slots 40 are located on the same edge 42 of the cartridge 30. The recesses 41 of the paired gripping slots 40 are separated by a partition 46 on the edge 42 of the cartridge 30. A lip or flange 48 on the partition 42 facilitates gripping by a first and second gripping mechanism (FIG. 8) on the carriage 120 as described in more detail hereinafter.

It is possible to store information on only one side of the optical storage disk 38. The optical scanners 26, which read or write on the optical storage disks 38, require that the one-sided optical storage disk 38 be inserted with the information coded side of the disk 38 adjacent the laser scanner (not shown) in the optical scanner 26. A hole 50, through the partition 46 between one pair of the gripping slots 40, is used to identify the correct orientation of the cartridge 30 when a single-sided optical storage disk 38 is used, in a manner described in more detail later in the specification. On cartridges 30 containing disks 38 with information stored on both sides of the disk 38, there are two holes 50 (not shown), one in each of the two partitions 46. The hole 50 is also used to verify proper storage positioning of the cartridges 30 as described in more detail later in the specification.

Figure 20:
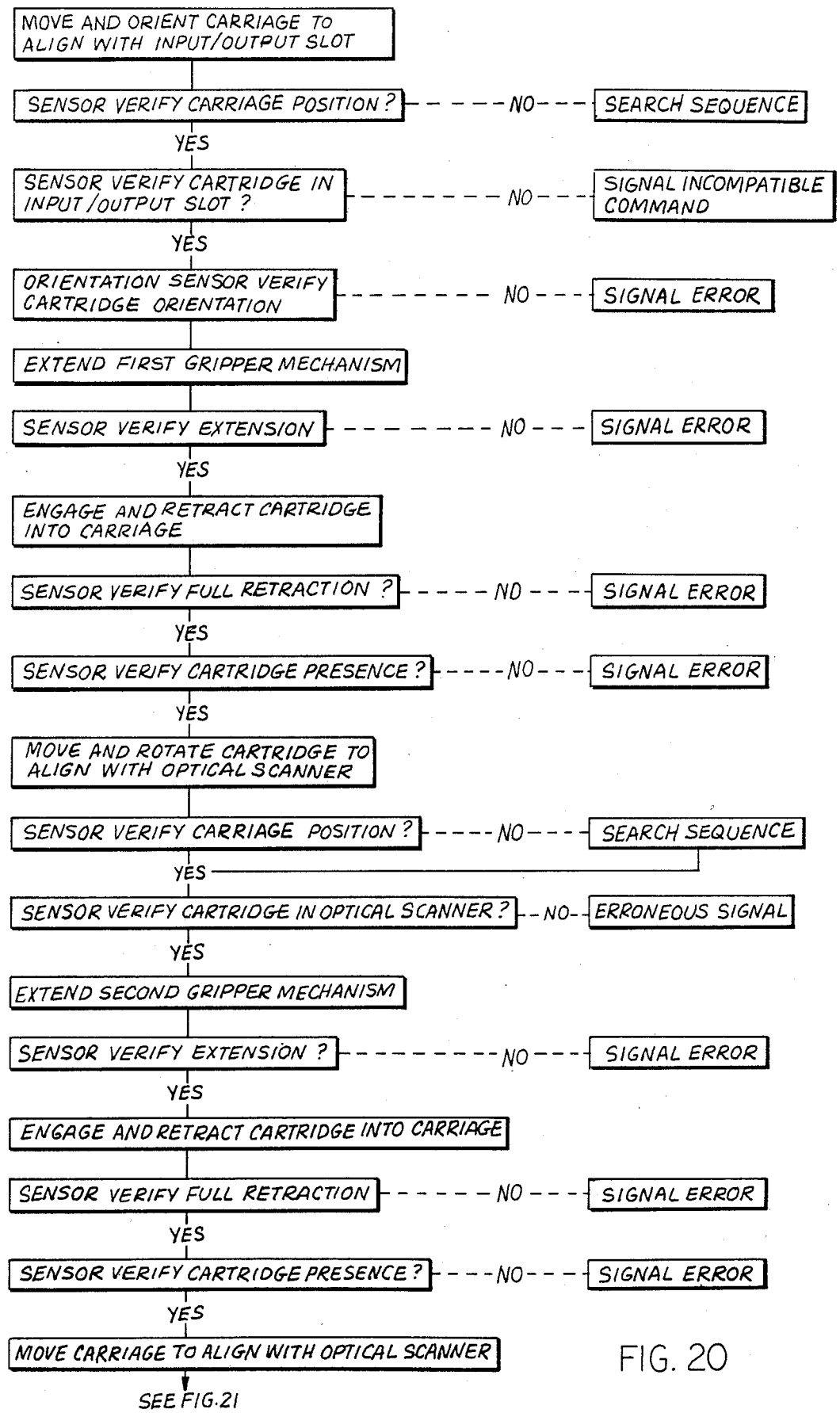
FIG. 20 is a flow chart showing typical sequence of operations for the optical storage and retrieval system of this invention.
Figure 21:
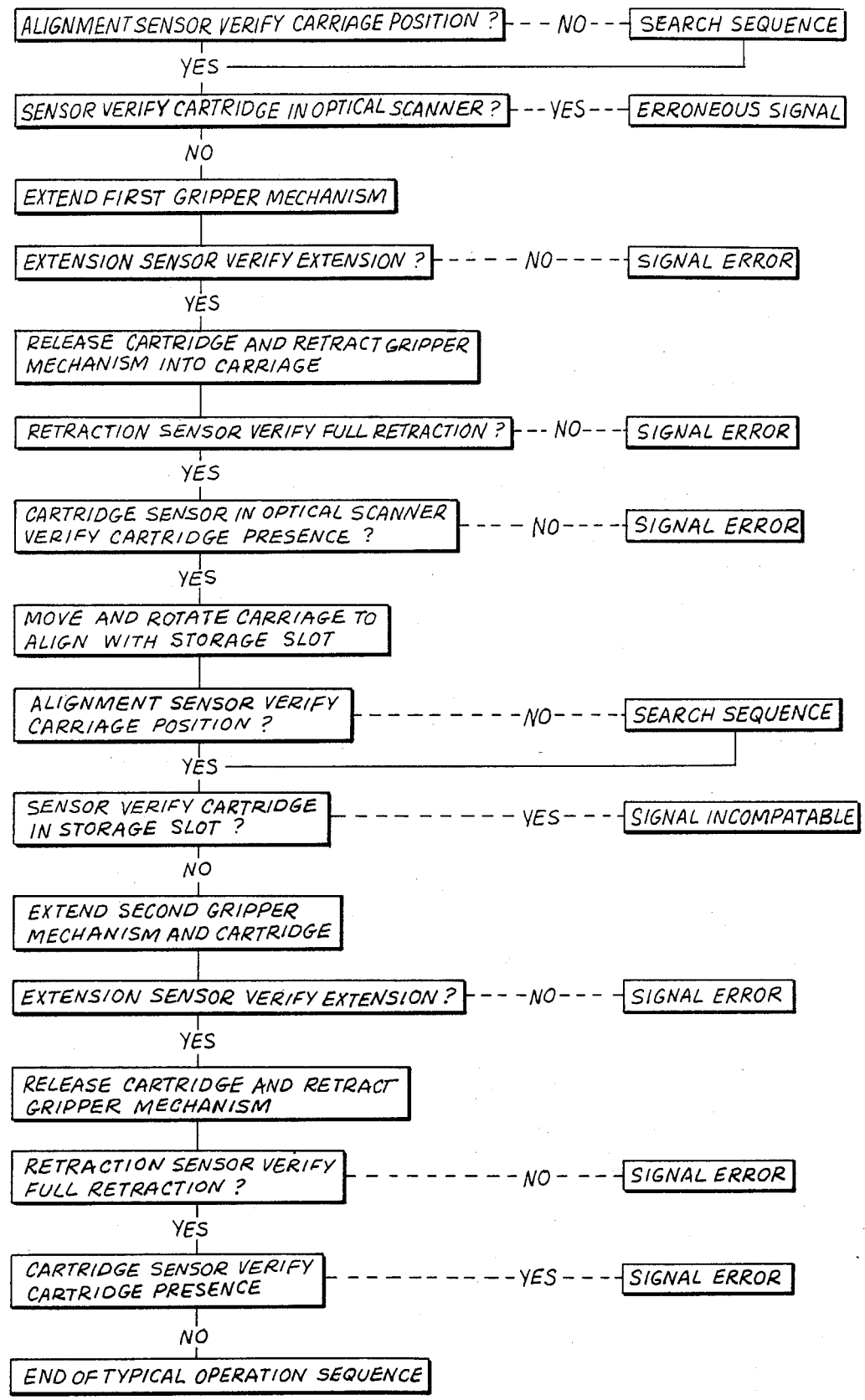
FIG. 21 is a flow chart showing typical sequence of operations for the optical storage and retrieval system of this invention.
Figure 22:
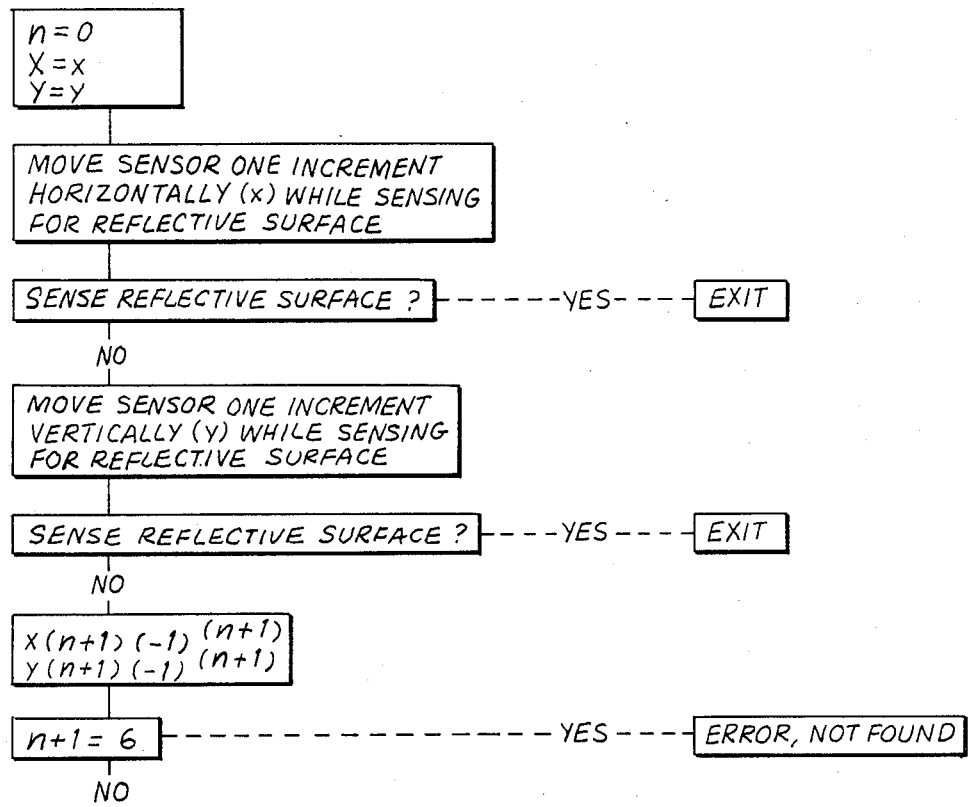
FIG. 22 is a flow chart of the search sequence used to locate alignment targets.

The optical storage and retrieval system 20 is perhaps best described by following a typical operation wherein a cartridge 30 (FIG. 3) is inserted into an input/output slot 54, transported to an optical scanner 26 to replace another cartridge 30 already in the optical scanner 26, and then stored in a cartridge storage slot 24. FIGS. 20, 21 are flow charts of the detailed operations performed by the computer 36 (FIG. 3) and the optical storage and retrieval unit 20, during the sequence. With this sequence in mind, FIG. 2 shows the input/output slot 54 with an exterior aperture 52, which is externally accessible. The exterior aperture 52 is preferably rectangular in order to correspond to the shape of the smallest cross sectional shape of the cartridge 30. The input/output slot 54 preferably consists of a single slot located on one end of the upper rack 23 of cartridge storage slots 24 (FIG. 5).

Referring to FIGS. 1 and 5, at the end of the input/output slot 54 interior to the housing 28, preferably at the middle height of the input/output slot 54, is located a retaining lever 55. The retaining lever 55 prevents the cartridge 30 from being inserted too far into the input/output slot 54, and further insures proper positioning of the cartridge 30 so that the cartridge 30 can be transferred to the carriage 120 (FIG. 1). When the door 56 (FIG. 2) to the input/output slot 54, is closed, a sensor (not shown) is activated which in turn activates a mechanism such as a solenoid (not shown), which retracts the retaining lever 55 so that the cartridge 30 can be withdrawn from the interior end of the input/output slot 54 and into the carriage 120.

As shown in FIG. 5, a position sensor 60 is used to verify that the cartridge 30 is inserted far enough into the input/output slot 54 so that the cartridge 30 is properly positioned for gripping by the the carriage 120. The position sensor 60 preferably takes the form of an infrared position emitter 62 and position detector 64 which are located such that the edge of the carriage 30 interrupts the infrared beam between the position emitter 62 and the position detector 64 when the cartridge 30 is correctly positioned. An indicator light (FIG. 2) may be connected to the position sensor 60 in order to indicate to the operator that the cartridge 30 has not been properly inserted into the input/output slot 54. The status of position sensor 60 is also monitored by the computer 36 to verify that compatible commands are given to the optical storage and retrieval system 20.

The position sensor 60 also provides a check to verify whether a cartridge 30 is in the input/output slot 54. This check is especially important to prevent the attempted insertion of a cartridge 30 into an input/output slot 54 or storage slot 24 which already contains a cartridge 30. Similarly, the check prevents the attempted removal of the cartridge 30 from an empty slot. The slot full/slot empty status is fed directly to the computer 36 (FIG. 3) which checks to verify that compatible commands are given. For example, if the position sensor 60 indicated a full input/output slot 54, then the computer 36 would not direct the carriage 120 to attempt to insert another cartridge 30 into the input/output slot 54.

Referring still to FIG. 5, to further insure that the cartridge 30 is correctly inserted into the input/output slot 54, an orientation sensor 66 is provided to check that the cartridge 30 is in the correct orientation. This orientation sensor 66 is preferably provided by an infrared sensor such as an orientation emitter 68 and an orientation detector 70, both of which are located at the lower interior edge of the input/output slot 54. The orientation emitter 68 and orientation detector 70 are placed on the opening sides of the input/output slot 54 in a position corresponding to that of the hole 50 in gripping slot 40, of cartridge 30 (FIG. 3). If the cartridge 30 is in the correct orientation, the gripping slot 40 with hole 50 is the lower of the two pairs of gripping slots 40 and, when correctly inserted, the hole 50 coincides with the location of the orientation emitter 68 and orientation detector 70. The infrared beam of the orientation emitter 68 thus passes through the hole 50 in the gripping slot 40 so that the orientation detector 66 senses the infrared beam to verify that the cartridge 30 is in the proper orientation. The status of the orientation sensor 66 is monitored by the computer 36 to insure proper orientation of the optical storage and retrieval system 20.

Referring to FIGS. 1, 5, 5a, and 2, the location of the input/output slot 54 is stored in nonvolatile computer memory in computer 36. Upon receiving an appropriate command from the computer 36, the carriage transport mechanism 180 moves the carriage 120 to the location of the input/output slot 54 and correctly positions and orients the carriage 120 with respect to the input/output slot 54 (or any of plural storage slots 24). The vertical and horizontal orientation of the carriage 120 with respect to the input/output slot 54 is verified by an alignment sensor 72 which is located on the end of the carriage 120 adjacent the input/output slot 54.

The alignment sensor 72 preferably takes the form of a reflective type infrared sensor which has an alignment emitter 74 (FIG. 13) and an alignment detector 76 (FIG. 13), both located on the end of carriage 120, such that the infrared beam from the alignment emitter 74 reflects from of a reflective surface 78 in a circular alignment target 80 (FIG. 5A) located on the frame 22 immediately adjacent the input/output slot 54. The location of the input/output slot 54 with respect to the alignment target 80 is known, as described in more detail later in the specification. The infrared beam from the alignment emitter 74 reflects off of the reflective surface 78 in the alignment target 80 and back into the alignment detector 76 in order to verify the position of the carriage 120, with respect to the input/output slot 54. The orientation of the carriage 120 is assumed to be correct. If the status of the alignment sensor 72 is not adequately verified by the computer 36, then the carriage 120 is vertically and horizontally translated through a preset search sequence locate the target 80, and thereby orient and correctly position the carriage 120.

The search sequence comprises moving horizontally a fixed increment X, and then moving vertically a fixed incremental distance Y. If the alignment target 80 is not located, then the carriage 120 and alignment sensor 72 are moved along a spiral path by moving horizontally by an increment of 2X in a direction opposite to that of the previous X movement and then moving vertically 2Y in a direction opposite to that of the previous Y movement. If no alignment target 80 is located, then the carriage 120 is moved an increment of 3X and 3Y, opposite the previous direction. This process is repeated moving 4X, 4Y, 5X, 5Y, etc., a fixed number of times, preferably six. If the alignment sensor 72 is not located by the end of the 6X and 6Y increments, then the search is terminated and a message sent to the operator that the alignment target 80 was not located.

As seen in FIG. 20, after the position of carriage 120 with respect to the input/output slot 54 has been verified, and after the input/output slot 54 has been verified as being full, the cartridge 30 can be transferred from the input/output slot 54 to the carriage 120 by a first or second gripper mechanism 128 or 130 respectively (FIG. 13), contained in the carriage 120, as described in more detail later in the specification.

For illustration, and referring to FIGS. 1, 8, 13 and 21, assume the first gripper mechanism 128 engages the gripping slots 40 (FIG. 8) on one side of the cartridge 30. The first gripper mechanism 128 then withdraws the cartridge 30 from the input/output slot 54 and retracts the cartridge 30 into the carriage 120. A retraction sensor 82 (FIG. 10) on the carriage 120 verifies that the cartridge 30 is sufficiently retracted or positioned in the carriage 120 so that the cartridge 30 has been completely withdrawn from the input/output slot 54 and will not be damaged during transportation. Once the cartridge 30 is fully retracted into the carriage 120, the carriage transport mechanism 180 can move the carriage 120 and cartridge 30 to either a storage slot 24 or to one of the optical scanners 26, depending upon what command is received from the computer 36.

Figure 10:
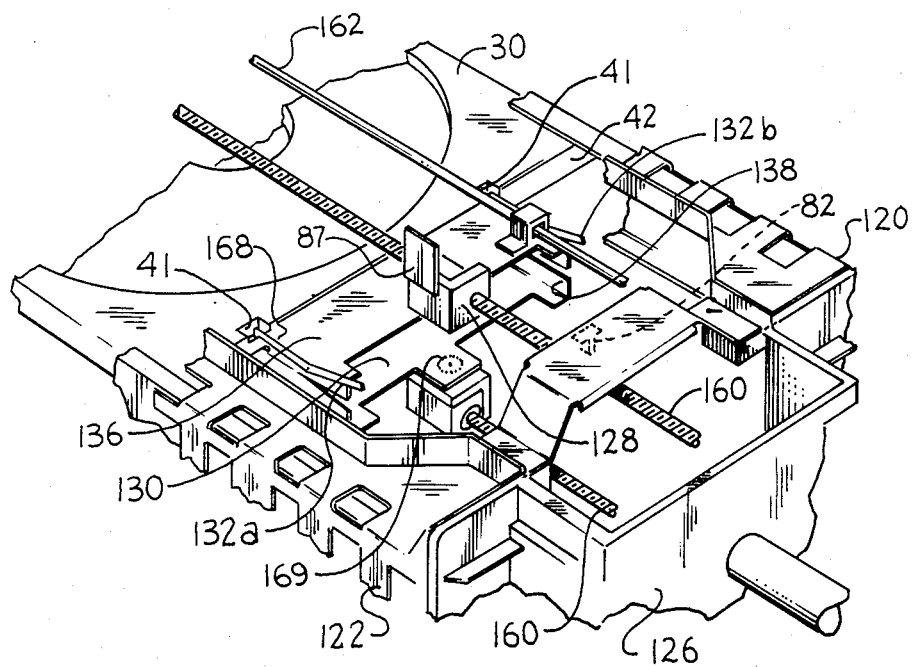
FIG. 10 is a perspective view showing part of the carriage and gripper mechanisms of this invention.

FIGS. 10, 11 and 12 show the retraction sensor 82 which is preferably an infrared sensor having a retraction emitter 84 and a retraction sensor 86 located on the carriage 120 such that a projection 87 activated by the first gripper mechanism 128, will interrupt the infrared beam between the retraction emitter 84 and the retraction detector 86 when the cartridge 30 is sufficiently retracted into the carriage 120.

Figure 9:
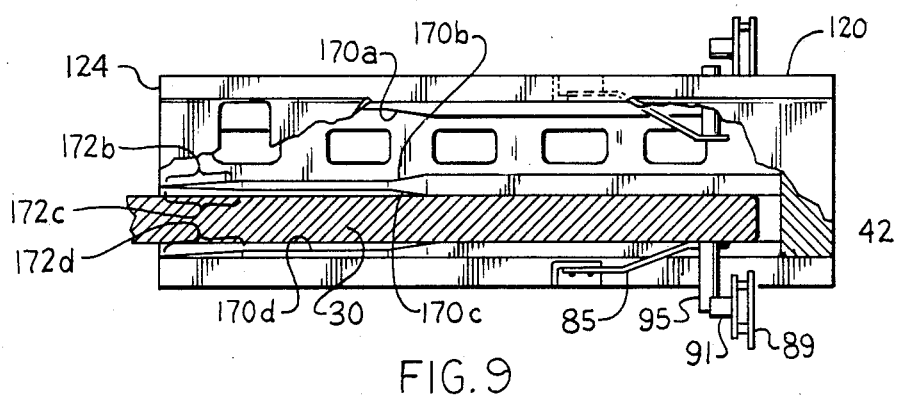
FIG. 9 is a sectional view of the carriage of FIG. 7, taken along 9—9 of FIG. 13.

Referring to FIGS. 9 and 20, a cartridge sensor 89 verifies that a cartridge 30 has been retracted into the carriage 120 by the first gripper mechanism 128 (FIG. 10). The cartridge sensor 89 comprises an infrared cartridge emitter 91 and an infrared cartridge detector 93 (not shown). A projection 95 is mounted on a leaf spring 85 which is deflected by the cartridge 30 as the cartridge 30 is retracted into the carriage 120, so as to activate the cartridge sensor 89.

Referring to FIGS. 1 and 21, if a command is received to transport the cartridge 30 to one of the optical scanners 26, then the carriage transport mechanism 180 moves the carriage 120 vertically and horizontally to the location of the desired optical scanner 26, which location is stored in nonvolatile computer memory in the computer 36. The carriage 120 is also rotated from the vertical orientation of the input/output slot 54 to the horizontal orientation of the optical scanner input/output slot 27. The rotation occurs simultaneously with the vertical and horizontal movement of carriage 120.

Figures 17, 18:
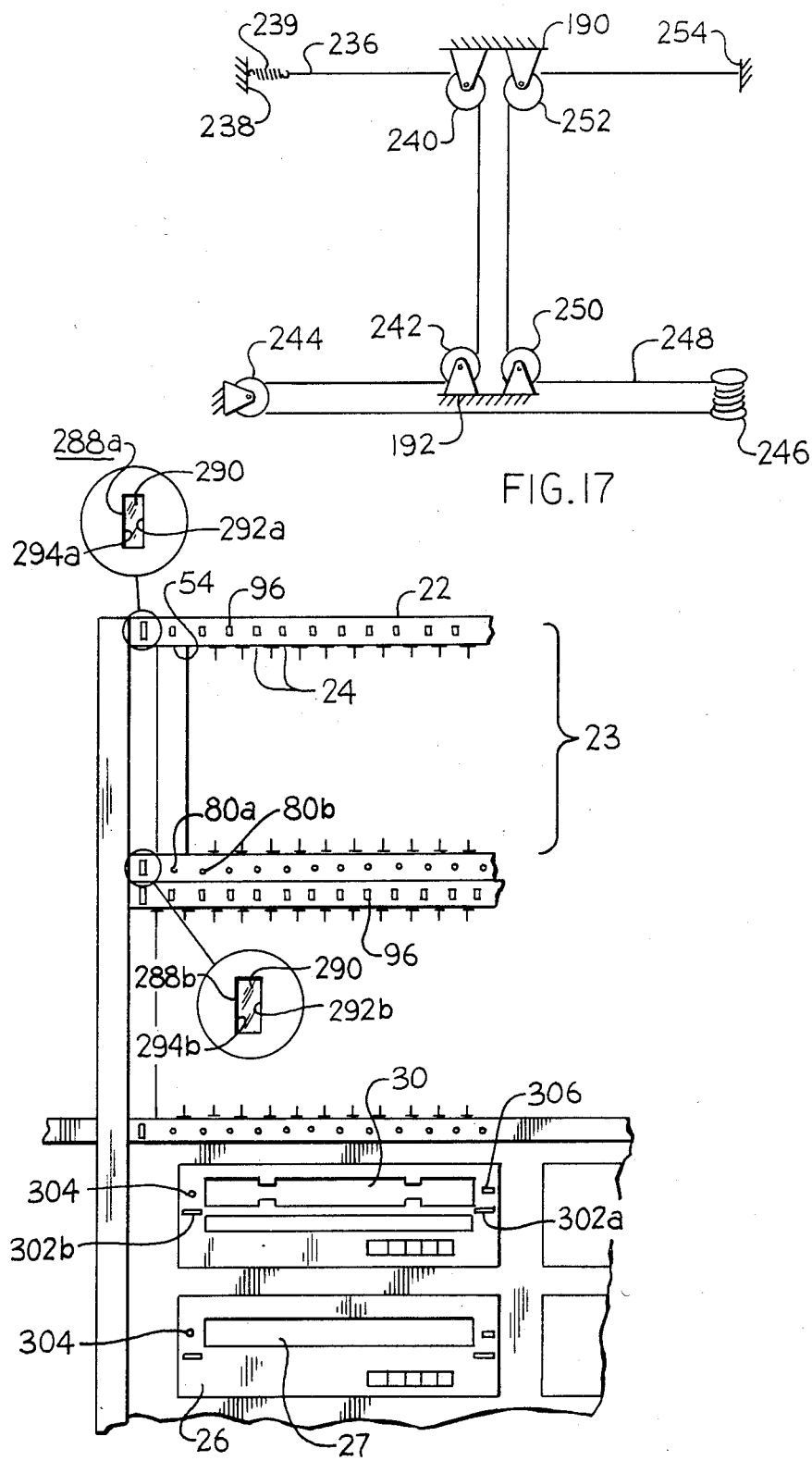
FIG. 17 is a schematic illustration of the pulley-cable, horizontal drive system of this invention.
FIG. 18 is an elevational view showing the alignment targets on a portion of the storage slots and optical scanners of this invention.

Referring to FIGS. 13, 18, and 21 the reflective type, infrared alignment sensor 72 on the end of the carriage 120 cooperates with a circular alignment target 304 adjacent the optical scanner input/output slot 27, in a manner previously described, in order to verify that the carriage 120 is properly positioned and oriented in front of the optical scanner input/output slot 27.

A microswitch (not shown) internal to the optical scanner 26 monitors whether there is a cartridge 30 in the optical scanner 26. The microswitch is connected to the computer 36 (FIG. 3) which checks to verify that compatible commands are sent. If there is already a cartridge 30 in the optical scanner 26 when the computer 36 expects an empty optical scanner 26, then the computer 36 signals the operator that incompatible commands were received. If there is a cartridge 30 in optical scanner 26, as expected in the predefined scenario, then the computer 36 will direct the carriage 120 to remove the cartridge 30 from the optical scanner 26 before attempting to insert the cartridge 30 which is retained in the carriage 120.

The second gripper mechanism 130 (FIG. 13) on the carriage 120 can be used to accomplish the removal of a cartridge 30 from the optical scanner 26 followed by the subsequent insertion of a different cartridge 30 from the carriage 120. Thus, the second gripper mechanism 130 is positioned adjacent the cartridge 30, and engages the cartridge 30 in the optical scanner 26 at the engaging slots 40, as described in greater detail hereinafter. The second gripper mechanism 130 slidably retracts the cartridge 30 within the carriage 120 until the retraction sensor 86 (FIG. 12) on the carriage 120 indicates that the cartridge 30 has been sufficiently retraced within the carriage 120 so as to protect the cartridge 30 from damage during transportation.

Referring to FIGS. 1, 18, and 21, the carriage 120 is then vertically translated until the replacement cartridge 30 is properly positioned in front of the now empty optical scanner input/output slot 27. The alignment sensor 72 and microswitch (not shown) verify the carriage 120 position and orientation, and that the optical scanner input/output slot 27 is empty and ready to receive the cartridge 30. The first gripper mechanism 128 (FIG. 13) then extends the cartridge 30 from the carriage 120 and into the optical scanner input/output slot 27.

FIGS. 12 and 13 show an extension sensor 88 on the carriage 120 which is used to determine when the first gripper mechanism 128, and the gripped cartridge 30, are extended to the proper position so as to release the cartridge 30 and to allow the subsequent withdrawal of the first gripper mechanism 128 from the cartridge 30 which is now inserted into the optical scanner input/output slot 27. A similar extension sensor 88 is located on the second gripper mechanism.

The extension sensor 88 comprises an infrared extension emitter 90 (not shown) and an extension detector 92 (not shown) located such that a projection 87 on the first gripper mechanism 128 interrupts an infrared beam between the extension emitter 90 and detector 92 when the first gripper mechanism 128 has extended a predetermined distance toward optical scanner input/output slot 27 so as to enable the first gripper mechanism 128 to safely release the cartridge 30. The extension sensor 88 functions in an identical manner when an empty first or second gripper mechanism 128 and 130 respectively, are extended to engage and retract a cartridge 30 into the carriage 120.

Having inserted the cartridge 30 into the optical scanner 26 the carriage 120 is now ready to complete the next command received from the computer 36. Assuming that the next command received was to place the cartridge 30 which was just removed from the optical scanner 26 into a storage slot 24, the sequence of operations would be as described hereinafter.

Referring to FIGS. 1 and 21, the carriage transport mechanism 180 would transport the carriage 120 and cartridge 30 to the correct location of the storage slot 24 into which the cartridge 30 was to be inserted. The carriage 120 is also rotated from the horizontal orientation of the optical scanner input/output slot 27 to the vertical orientation of the storage slots 24. When the carriage 120 is positioned by the carriage transport mechanism 180 in front of the correct storage slot 24, the alignment sensor 72 on the end of the carriage 120 cooperates with the alignment target 80 on the frame 22 adjacent the storage slot 24 into which the cartridge 30 is to be inserted, in order to verify the position and orientation of the carriage 120 relative to the storage slot 24. A slot full sensor 96 is then used to verify that the storage slot 24 is empty and ready to receive the cartridge 30 from the carriage 120.

FIG. 6 shows the reflective portion of the slot full sensor 96 which is preferably a reflective surface 98 which is moved out of detectable position when a cartridge 30 is sufficiently inserted into a slot such as storage slot 24. The slot full sensor 96 operates in a manner analogous to the reflective infrared sensor such as alignment sensor 72, with the infrared emitter and detector located on the carriage 120.

FIG. 6 schematically illustrate one embodiment of the slot full sensor 96 in which a reflective surface 98 is mounted on a vertical projection 100 of a slidably supported member 102, the opposite end of which forms a depending engaging surface 104. The slidably supported member 102 is located at the top of the storage slots 24 such that the engaging surface 104 depends or projects down into the storage slot 24 so as to contact the upper edge of cartridge 30 when the cartridge 30 is almost completely inserted into the storage slot 24. As the engaging surface 104 contacts the cartridge 30, the cartridge 30 slides the member 102 along the length of the storage slot 24, thus, moving the reflective surface 98 away from the slot full aperture 106 in frame 22 such that the reflective surface 98 cannot reflect sufficient infrared light through the slot full aperture 106 to activate the slot full sensor 96.

The reflective surface 98 is resiliently urged against the slot full aperture 106 in the frame 22 by means such as a tension spring 108. When positioned against the slot full aperture 106, the reflective surface 98 can reflect a sufficient amount of light to activate the infrared slot full sensor 96, thereby indicating the position of the member 102 which indicates whether the storage slot 24 is full or empty.

As shown in FIGS. 21 and 13, when the computer 36, which monitors the status of slot full sensor 96, verifies that it has received a compatible command and that the storage slot 24 is empty and ready to receive the cartridge 30, then the second gripper mechanism 130 (FIG. 13) slidably extends the cartridge 30 from the carriage 120 and into the storage slot 24. An extension sensor 88 on the carriage 120 is used in a manner previously described to control the extension of the second gripper mechanism 130 so that the cartridge 30 is inserted the correct amount into the storage slot 24 when the second gripper mechanism 130 releases the cartridge 30. When the cartridge 30, is released, the second gripper mechanism 130 is retracted into the carriage 120 so that the second gripper mechanism 130 will not hit and damage any structure or components during subsequent movements of the carriage 120.

FIG. 5 shows a storage alignment sensor 110 which is used to verify that the cartridges 30 are not only stored in the correct orientation, but are also properly positioned within the storage slots 24 in the upper rack 23 or lower rack 25 (FIG. 18). The storage alignment sensor 110 can take the form of an infrared storage alignment emitter 112 and a storage alignment detector 114, each of which are located on opposing sides of a row or series of storage slots 24 such as upper rack 23 or lower rack 25 (FIG. 18). The storage alignment emitter 112 and detector 114 are located towards the bottom of the storage slots 24, but at a height above the bottom of the storage slots 24 which corresponds with the location of the hole 50 in gripping slot 40 in the cartridges 30, when the cartridges 30 are inserted into storage slots 24.

Thus, when the cartridges 30 are correctly oriented and positioned, the infrared beam from the storage alignment emitter 112 passes through the holes 50 in the gripping slots 40 in cartridges 30 and is detected by the storage alignment detector 114. Since there is only one hole 50 in the single sided gripping slots 40 in each cartridge 30, if the single sided cartridge 30 is not correctly oriented when it is placed in the gripping slots 40, then the infrared beam will be interrupted and the improper orientation detected. There are two holes 50, one each in the two pairs of gripping slots 40 of the cartridges 30 containing disks 38 coded on both sides. Thus the orientation of the two-sided disks 38 is not detected by the storage alignment sensor 110.

In a similar manner, if a cartridge 30 is not sufficiently inserted into the storage slot 24, or if the cartridge 30 is inserted too far into the storage slot 24, then the infrared beam from the storage alignment emitter 112 will not align with the hole 50 in the cartridge 30 with the result that the infrared beam is interrupted and not detected by storage alignment detector 114. The storage alignment detector 114 can be connected to audio, visual, or other signaling devices to make the operator or computer 36 (FIG. 3) aware of the improper alignment or orientation.

Having thus followed through one sequence of operations of the optical storage and retrieval system 20, a more detailed explanation of several aspects can be better understood.

FIGS. 10 and 13 show the carriage 120. A generally rectangular carriage frame 122 has a latching end 124 (FIG. 13) which is adjacent the storage slots 24 during operation. The carriage frame 122 also has a mounting end 126 which is rotatably connected to a moveable support plate 182 (FIG. 13) on a movable support structure 181 (FIG. 13), as described later in the specificaton. The carriage frame 122 supports the first and second gripper mechanism 128 and 130, as well as the cartridges 30 (FIG. 10) being transported. As discussed earlier, the first and second gripper mechanisms 128 and 130 respectively, serve to slidably retract or extend the cartridge 30 into and out of the carriage 120.

Figure 7:
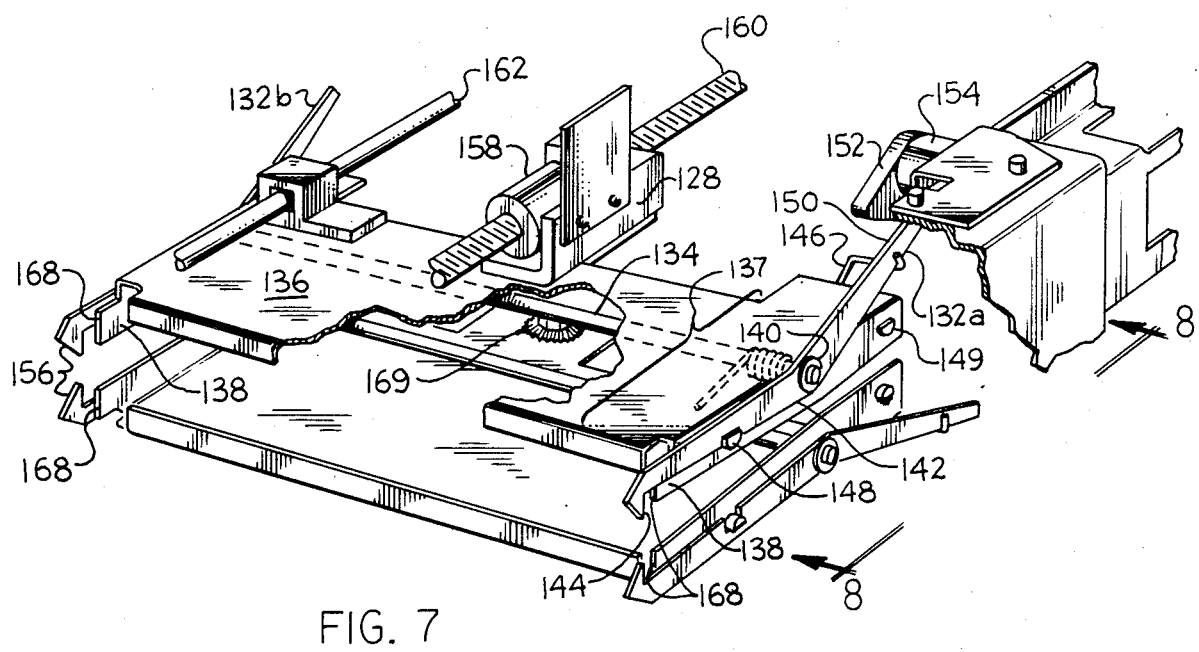
FIG. 7 is a perspective view of the gripper mechanisms of this invention.

Referring to FIG. 7, the first gripper mechanism 128 comprises two gripper arms 132a and b which are connected to opposite ends of a common shaft 134. The gripper arms 132 and the shaft 134 are rotatably mounted in a gripper frame 136 which takes the form of a generally flat rectangular plate portion 137 and two narrow ends 138 bent 90° with respect to the flat portion 137 of the plate to form two support tabs 138. The shaft 134 is rotatably mounted through apertures 140 in the support tabs 138. The gripper arms 132 are connected to the shaft 134 on the outside surfaces of the support tabs 138, with the axial length of the gripper arms 132 being generally along, but at an angle to, the plane of the flat portion 137 of gripper frame 136.

Figure 8:
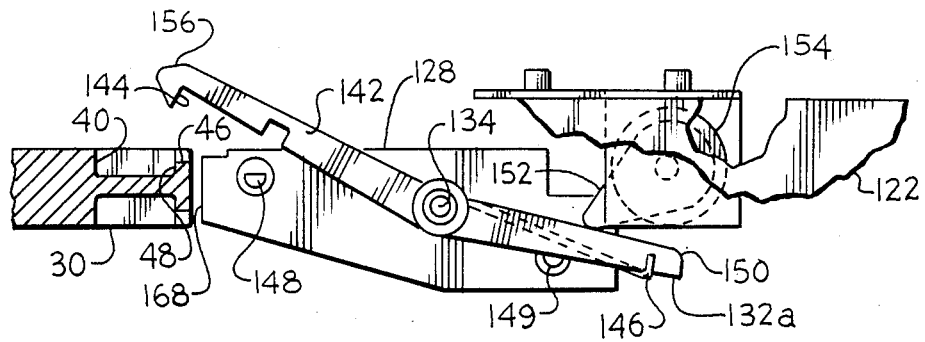
FIG. 8 is an elevational view taken along 8—8 of FIG. 7, showing a gripper arm engaging a gripping slot in a cartridge.

FIGS. 7 and 8, and particularly FIG. 8, illustrate the function and operation of one of the gripper arms 132a as it engages a gripping slot 40 on the cartridges 30. The gripper arm 132a has a generally elongated body 142 having an engaging portion 144 at one end thereof. The engaging portion 144 has a hooked shape suitable for cooperating with the shape of the gripping slots 40 and flange 48 on the cartridge 30 in order to releasably engage those portions of the cartridge 30. The flange 48 cooperates to engage the engaging portion 144 as the cartridge is slidably retracted into the carriage 120. The gripper arm 132a pivots about the axis of the shaft 134 to which it is connected. The gripper arm 132a is resiliently urged into a latched or engaging position by a torsion spring 146 (FIG. 13) which is wound around the shaft 134 but connected to the gripper arm 132a such that the gripper arm 132a is urged toward or against a stop 148 mounted on the support tab 138. A second stop 146 limits rotation of the gripper arm 132a in the opposite direction, but allows the gripper arms 132 to rotate sufficiently that engaging portion 144 can engage slots 44 on cartridges 30.

At the end of the gripper arm 132 opposite the engaging portion 144, is a cam follower portion 150 which cooperates with a cam mechanism to open and close, or latch and unlatch the gripper arms 132a and b from the gripping slots 40 and cartridges 30 as described hereinafter. A cam 152 is rotatably mounted to a cam drive such as a two position rotary solenoid 154. In the first position, the rotary solenoid 154 is not engaged with the cam follower portion 150 on gripper arm 132a. In the second position, the cam 152 engages the cam follower portion 152 so as to open the gripper arms 132.

The rotary solenoid 154 is mounted to the side of the carriage frame 122 adjacent the latching end 124 (FIG. 13) of carriage 120 such that when the extension sensor 88 (FIG. 13) indicates that the first gripper mechanism 128 is properly extended, the cam 152 is adjacent to and almost contacting the cam follower portion 150 of the gripper arm 132a.

Rotation of the cam 152 by the rotary solenoid 154 causes the cam 152 to engage the cam follower portion 150 on the gripper arm 132a so that the gripper arms 132a and b pivot about the shaft 134 away from the stop 148 and into an open or unlatched position. In this open or unlatched position, the engaging portion 144 of gripper arm 132 does not engage the gripper slot 40 and flange 48 in cartridge 30 (FIG. 8). Since the gripper arms 132a and b are fixedly connected to a common shaft 134, both the gripper arms 132a and b simultaneously engage or disengage the gripping slots 40 in cartridge 30. There is only one rotary solenoid 154 and cam 152 on the first gripper mechanism 128.

The latching of the gripper arms 132a and b with the engaging slots 40 and cartridge 30 proceeds in a manner analogous to the unlatching of those components. In the latching operation, however, it is preferable to have the gripper arms 132a and b in an open or unlatched position before the engaging portion 144 is positioned adjacent the latching slots 40 on the cartridges 30. One fail-safe method for achieving this open position is to rotate the cam 152 into a position where it contacts the cam follower portion 150 whenever the gripper arms 132 are moved adjacent the cam 152. This prepositioning of the cam 152 can only be used when there is no cartridge 30 presently retracted by the first gripper mechanism 128 in the carriage 120, otherwise the cartridge 30 could be prematurely released by the gripper arms 132.

The preferred latching or engaging sequence is to have the cam 152 rotated to actuate the gripper arms 132 after the first gripper mechanism 128 has been extended a predetermined distance from carriage 120, and before the engaging portion 144 is positioned adjacent the gripping slots 40. After the gripper arms 132 have been extended adjacent the gripping slots 40, the solenoid 154 rotates the cam 152 so as to release the gripper arms 132 and allow them to close and latch the cartridge 30 by engaging the gripper slots 40.

As shown in FIGS. 7 and 8, the end of gripper arms 132 adjacent the engaging portion 144 are shaped to have a curved or ramped surface 156 on the exterior edge adjacent the cartridges 30. Thus, if the gripper arms 132 are inadvertently not placed in the open position as the gripper arms 132 approach the cartridge 30, then the ramped surface 156 will contact the partition 46 between the gripping slots 40 on cartridge 30 to slide or ramp the gripper arms 132 over the edge of the partition 46 until the engaging portion 144 engages the gripping slots 40 and the flange 48.

The elongated body 142 of the gripper arms 132 is curved or angled so that the engaging portion 144 is offset from the pivot axis of the shaft 134 when the engaging portion 144 is engaged with the gripping slots 40 on the cartridges 30. The force exerted by the cartridge 30 on the engaging portion 144 is thus offset from the pivot axis of the shaft 134 to cause a closing or engaging moment about the pivot axis of the shaft 134 to encourage the engaging portion 144 to remain in contact with the gripping portion 40 of the cartridge 30. This arrangement is commonly referred to as an overcenter latch.

The size or spring rate of the torsion spring 146 depends upon the closing rate or latching rate which is desired in the latching operation of the gripper arms 132. A torsion spring with a spring constant of 0.68 ounce inches per radian has been found suitable for use with the gripper arms 132.

As shown in FIGS. 8 and 10, the gripper arms 132a and b grab or latch the latching slots 40 so that the cartridge 30 is manipulated by being engaged from one side of the cartridge 30. Alternately phrased, the first and second gripper mechanisms 128 and 130, respectively, do not contact or grab opposing surfaces of the cartridge 30. Rather, the cartridge 30 is manipulated by contact with one surface of the cartridge 30. Additionally, that one surface of contact is a side surface, not the bottom surface where gravity would help maintain contact between the cartridge 30 and the gripper arms 32. After the gripper arms 132 engage the gripping slots 40, the engaged cartridge 30 is slid from the storage slot 24 into the carriage 120. Thus, the gripper arms 132 need only exert a pulling force in order to retract the cartridge 30 into the carriage 132.

As shown in FIG. 10, the gripper arms 132 do contact the cartridge 30 at plural locations, preferably at two locations on the same surface. The cartridge 30 uses two spaced apart gripping slots 40 in order to insure that the circular optical disk 38 does not contact the recess 41 formed by the gripping slots 40 in the edge of the square container which encloses the circular optical disk 38. A single gripping slot 40 could be located along the edge 42 on container 30, so long as the optical disk 38 does not contact the recess 41 formed by the gripping slot 40.

Referring to FIGS. 7, 10 and 13, means are shown by which the gripper arms 132 of the first and second gripper mechanisms 128 and 130 respectively, are extended from, and retracted into the carriage 120. The flat portion 137 of gripper frame 136 is connected to an elongated follower nut 158 which surrounds and has internal threads that mate with a multiple-lead lead screw 160 (FIGS. 11 and 12). The lead screw 160 is substantially parallel to the rotational axis of the carriage 120 and extends the length of the carriage frame 122, being connected to the latching end 124 (FIG. 13) and to the mounting end 126 of the carriage frame 122. An anti-rotation rod 162 is located substantially parallel to the lead screw 160 and is slidably connected to the gripper frame 136, preferably adjacent to one of the support tabs 138.

As the lead screw 160 is rotated, the elongated follower nut 158 must either rotate about, or translate along the length of the lead screw 160. The anti-rotation rod 162 prevents the rotation, thus, forcing the elongated follower nut 158, and the gripper frame 136 and gripper arms 132, to translate along the length of the lead screw 160. If the gripper arms 132 are latched or engaged with a cartridge 30 (FIG. 10), then the cartridge is retracted or extended along with the gripper arms 132.

FIG. 13 shows a gripper drive motor 164 which drives the lead screw 160 through a gripper drive train 166. A stepper motor having a step size of fifteen (15) degrees per step, which results in a translation of the first gripper mechanism 128 of 0.031 inches per step, has been found suitable for the gripper drive motor 164. A 1.36:1 gear reduction for the gripper drive train 166, in conjunction with a lead screw 150 having five multiple leads and a lead of one inch per revolution, completes the drive train.

Using the above described components, it is believed that a typical cartridge 30 can be extended from the carriage 120 and inserted into a storage slot 24 within 0.9 seconds. A latching time of 60 milliseconds is believed achievable. An elapsed time of 1.0 seconds to extend the gripper arms 132, latch a cartridge 30, and retract the cartridge 30 into the carriage 120 is also believed possible.

FIGS. 7, 10 and 13 show an alignment means which is provided to align the engaging portions 144 of gripper arms 132 with the engaging slots 40 of cartridges 30. The gripper frame 136 is connected to the elongated nut 158 so that the gripper frame 136 can rotate in the plane of the gripper arms 132a and b, which plane is substantially parallel to the vertical plane of the storage slots 24 when the carriage 120 is orientated along the vertical plane of the storage slots 24. A wavy washer 169 is provided at this pivot point to provide a tight fit with a limited friction that inhibits the gripper frame 136 from rotating until an alignment force is applied to it.

The alignment force is provided by a bumpers 168a and b which are located on the gripper frame 136 intermediate the gripper arms 132a and b, the bumpers 168 being immediately adjacent the cartridge 30 when the gripper arms 132 engage the cartridge 30. The bumpers 168 serve to align the two gripper arms 132a and b with the engaging slots 40 in the cartridge 30. The bumpers 168 function as follows: if the gripper arms 132a and b are not correctly aligned with the gripping slots 40, then one of the bumpers 168a or 168b will hit the edge 42 of the cartridge 30 and cause the gripper frame 136 to become aligned with the cartridge 30, and thus cause the gripper arms 132a and b to become aligned with the gripping slots 40.

Referring to FIGS. 8 and 10, as the cartridge 30 is extended from the carriage 120 into a storage slot 24, the gripper arms 132 do not primarily cause movement of the cartridge 30. Rather, the bumpers 168 on the gripper frame 136 push against the edge 42 of cartridge 30 in order to slide the cartridge 30 out of the carriage 120 and into the storage slot 24. To the extent the end of gripper arm 132 adjacent the ramped surface 156 may contact a portion of the recess 41, the gripper arms 132 can exert a force on the cartridge 30.

Referring to FIG. 9, in order to facilitate the alignment of the cartridge 30 as it is retracted into the carriage 120, two pairs of converging guide rails 170a, b, c, d are placed on each of the smaller sides 123 and 125 (FIG. 13) of the mounting frame 122. The converging guide rails 170 have a first converging portion 172 which opens onto the latching end 124 of carriage 120 adjacent the storage slots 24. The space between the first converging portion 172a and b, and 172c and d of the converging guide rails 170 is larger than the width of the edge 42 of cartridge 30 which will be pulled between the converging guide rails 170 by the first and second gripper mechanisms 128 and 130 (FIG. 13) respectively. This wide spacing on the first converging portion 172 prevents the edge 42 of the cartridge 30 from being damaged by contact with the end of the converging guide rails 170 as the cartridge 30 is retracted into the carriage 120. As the cartridge 30 is retracted further into the carriage 120, the converging guide rails 170 converge further until the distance between the converging guide rails 170 is approximately equal to the width of the edge 42 of the cartridge 30.

By the time the cartridge 30 is completely retracted to the carriage 120, the cartridge 30 is correctly positioned and oriented within the carriage 120. Thus, the weight distribution of the carriage 120 can be accurately pre-determined and will not vary due to the cartridge 30 constantly changing its position as the carriage 120 is translated or rotated.

As shown in FIG. 5 there is an analogous converging rail arrangement on the interior openings of the storage slots 24. There are rails 174 intermediate the storage slots 24. The rails 174 serve to accurately position the cartridges 30 when they are inserted into the storage slot 24. The interior end of the rails 174 which are adjacent the carriage 120, converge toward a point so that the effective distance between two adjacent rails 174 is wider than the width of the edge 42 of cartridge 30, at the location where the cartridge 30 is inserted into the storage slot 24, so as to minimize the possibility that the edge 42 of the cartridge 30 will be damaged by being forced against the end of the rails 174. The distance between the rails 174 narrows away from the end of the rail 174 adjacent the carriage 120, until the distance between the rails 174 is substantially equal to the width of the edge 40 of cartridges 30.

The end of the rails 174 adjacent the carriage 120 also taper so as to provide a wider slot height along the height of the cartridge 30. As with the other converging rails, the convergence minimizes damage to the cartridges 30 during initial insertion into the storage slots 24, yet provides accurate positioning of the cartridges 30 when the cartridges 30 are sufficiently inserted into the storage slots 24.

Referring to FIGS. 7, 10 and 13, the second gripper mechanism 130 is identical to that of the first gripper mechanism 128, but is located on the other half or side of the carriage frame 122. Since the construction and operation of the second gripper mechanism 130 is the same as the first gripper mechanism 128, it will not be repeated in detail herein.

Referring to FIG. 1, the use of two independently operable gripper mechanisms such as first and the second gripper mechanisms 128 and 130 allows a more efficient transportation and exchange of cartridges 30 than is possible if only one gripper mechanism were to be used. For example, it is possible for the first gripper mechanism 128 to remove a cartridge 30 from a storage slot 24; the carriage 120 can then be horizontally translated so that a different cartridge 30 retained by the second gripper mechanism 130 can be inserted into the same storage slot 24 which was just emptied by the first gripper mechanism 128. This exchange sequence can be completed in approximately 2.3 seconds.

Referring to FIG. 13, in order to maximize the response time of the optical storage and retrieval system 20, it is desirable to make the components as light as possible. For example, the carriage 120 is of a lightweight construction so as to minimize the mass which is cantilevered from the moveable support plate 182. This lower mass has the effect of minimizing the inertia which must be overcome before the carriage 120 can be repositioned. Additionally, a lower mass will generally increase the structural frequency with the result that the motion of the latching end 124 of the cantilevered carriage 120 will not be so great as to require an extended settling time to wait for the vibrational motion to cease before the cartridge 30 can be removed or inserted into the storage slots 30 without hitting the frame 22 or the end of the rails 174.

A further reduction of mass and an increase in response to time is obtained by having the gripper arms 132 designed to merely pull or slide the cartridge 30 into the carriage 120, rather than designing the gripper arms 132 to support and carry the weight of the cartridge 120. Thus the carriage 120 primarily supports the weight of the cartridge 30, rather than the gripper arms 132.

The design of the optical storage and retrieval system 20 is believed to be such that a maximum of 5.6 seconds will elapse before a single cartridge 30 can be retrieved from the most distant storage slot 24, and inserted into the most distant optical scanner 26. The design of the carriage transport mechanism 180 is discussed hereinafter.

FIG. 1 shows an overview of the carriage transport mechanism 180, which comprises a movable support structure 181 which contains a moveable support plate 182 on which the carriage 120 is mounted so as to be rotatable and vertically positionable. The entire movable support structure 181 translates in order to horizontally position the carriage 120.

Figures 14, 15, 16:
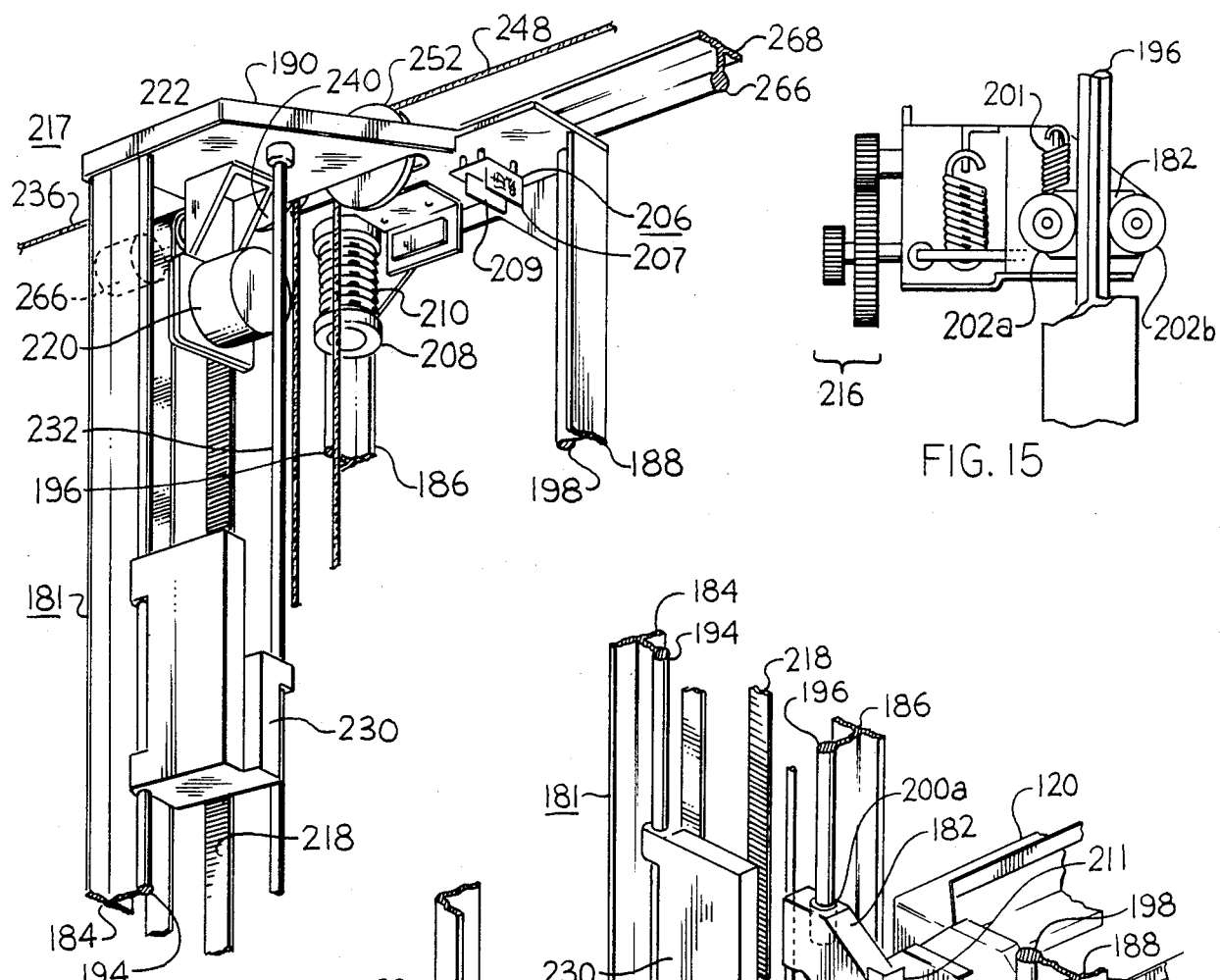
FIG. 14 is a perspective view showing the upper portion of the carriage transport system of this invention.
FIG. 15 is a partially sectioned elevational view taken along 15—15 of FIG. 13.
FIG. 16 is a perspective view showing a portion of the carriage and the lower portion of the carriage transport system of this invention.

FIGS. 14 and 16 show the moveable support structure 181 in greater detail. First, second, and third substantially parallel, vertical support members 184, 186, and 188, respectively, are connected at opposite ends to upper support plate 190 (FIG. 14) and lower support plate 192 (FIG. 16). The first, second, and third support members 184, 186, 188, respectively, are preferably of a lightweight I-beam or T-section construction. Three substantially parallel mounting rods, 194, 196, and 198, respectively, are connected to the first, second and third support members 184, 186, 188, respectively, with one rod being attached to and supported by one support member.

The mounting rods 194, 196, and 198 can be $\frac{5}{8}$ inch diameter rod and are supported by the first, second, and third support members 184, 186, 188, respectively, along a vertical line such that a low friction coupling can translate the length of the mounting rods 194, 196, or 198, without hitting or being obstructed by the connections to the supporting members 184, 186, or 188. These low friction couplings can take the form of a recirculating ball bushing, or linear bearing which fits on the outside of the mounting rods 194, 196, or 198, and encloses approximately 80% of the circumference of the mounting rods.

Referring to FIG. 16, there is shown upper and lower low friction couplings 200a and b which are slidably connected to the first support mounting rod 196. The upper and lower low friction couplings 200a and b are fixedly connected to and support the movable support plate 182.

FIGS. 13, 15 and 16 show a pair of low friction rollers, such as bearing mounted wheels 202a and b, which are mounted on the movable support plate 182, but are also placed so as to contact opposite sides of the second support mounting rod 196. A spring 201 resiliently urges the bearing mounted wheel 202a against the mounting rod 196, the bearing mounted wheel 202b being fixedly mounted to movable support plate 182. The pair of bearing mounted wheels 202a and b thus inhibit rotation of the movable support plate 182 about the axis of the first support mounting rod 194 (FIG. 16).

Referring to FIG. 16, the upper and lower low friction couplings 200a and b and the bearing mounted wheels 202a and b allow vertical motion of the movable support plate 182 to occur with minimum restraint. The upper and lower friction couplings 200a and b carry the force components occurring in the horizontal plane and restrain all rotations except for rotation about the axis of the first support member 184 and the first mounting rod 194. Thus, the movable support plate 182 is restrained in a statically determinate manner except for vertical forces and vertical travel along the axis of the first mounting rod 194.

The strength and stiffness of the movable support plate 182, and the size and shape of the upper and lower low friction couplings 200a and b and the bearing mounted wheels 202, are such that the carriage 120 can be cantilevered from the movable support plate 182 and positioned vertically by moving the movable support plate 182 along the first and second vertical mounting rods 194 and 196, without binding and without causing undue motion or vibration of the end of the carriage 120 which is cantilevered from the movable support plate 182. It is believed that a suitably stiff structure can be provided by using 1.5 inch long linear bearing for the upper and lower low friction couplings 200a and b.

Referring to FIGS. 17 and 16, limit sensors and stops are provided to prevent the movable support plate 182 and the carriage 120 from being driven into the surrounding structure such as the frame 22. Two vertical limit position sensors 206 are attached, one each, to the upper support plate 190 and to the lower support plate 192. These two vertical limit position sensors 206 each comprise an infrared vertical limit emitter 207 and a vertical limit detector 209 (FIG. 14) as previously described and operate by having a projection 211 (FIG. 16) on the movable support plate 182, interrupt the infrared beam between the vertical limit emitter 207 and the vertical limit detector 209 in order to indicate that the movable support plate 182 is approaching one of its maximum limits of vertical travel.

A spring loaded limit stop 208 is also provided on both the upper support plate 190 and the lower support plate 192. The spring loaded limit stop 208 comprises a spring 210 which resiliently urges the movable support plate 182 to come to a gradual rest when the movable support plate 182 exceeds its predetermined vertical travel limits and contacts the limit stop 208.

As shown in FIGS. 13 and 16, the carriage 120 is cantilevered from the movable support plate 182 by, and rotates about, a pivot shaft 212 (FIG. 13). The pivot shaft 212 is rotatably mounted from the movable support plate 182 by using a pair of standard 25 millimeter ball bearings (not shown). An axial preload spring (not shown) is used to preload the ball bearings on the pivot shaft 212 so as to minimize the motion of the carriage 120 as it is cantilevered from the movable support plate 182.

Referring to FIG. 13, a pivot drive motor 214 is mounted on the movable support plate 182 in order to rotate or pivot the carriage 120 through a pivot drive train 216. The pivot drive train 216 uses anti-backlash pinions (not shown) in order to increase the rotational accuracy and stiffness of the carriage 120 as it is driven by the pivot drive motor 214.

A 35 ounce-inch stepper motor having 400 steps per revolution, and using a 15.55:1 gear reduction has been found suitable for use as the pivot drive motor 214 and pivot drive train 216. These components result in a rotation of 0.0001 radians per step of pivot drive motor 214, or a 0.007 inch lateral motion of the alignment sensor 72 on the end of the carriage 120, for each step of the pivot drive motor 214.

FIG. 13 shows spring loaded limit stops such as rotational stop 215 which engage stops (not shown) on the movable support plate 182 in order to limit the maximum amount of rotation of the carriage 120. Rotational stop 215 comprises a spring 217 connected between the movable support plate 182 and a lever 219 such that when a rotational stop 221 on the mounting end 126 of carriage 120 engages the lever 219, the carriage 120 is urged to a stop by extension of the spring 217. The lever 219 will rotate a fixed amount before being stopped by the movable support plate 182, thus providing a maximum limit to the extension of spring 217 and the rotation of carriage 120. The carriage 120 is designed to rotate approximately ±92° about a vertical axis.

Rotational limit sensors (not shown) analogous to the previously discussed infrared limit sensors, are used to indicate when the carriage 120 has reached one of the extreme limits of rotation. The computer 36 monitors the status of these limit sensors, as well as the status of the other sensors described herein.

Referring to FIGS. 14 and 16, and especially to FIG. 14, the vertical drive mechanism 217 comprises a motor drive belt assembly 218 which is used to vertically position the movable support plate 182 and the carriage 120 (FIG. 16). A vertical drive motor 220 is mounted on the upper support plate 190 and connected to a vertical drive train 222 which drives the drive belt 224. The drive belt 224 passes around drive pulley 225 (FIG. 16) on the lower support plate 192. The drive belt 224 is connected to the movable support plate 182 so that the vertical drive motor 220 can vertically position the movable support plate 182 and the carriage 120 which is mounted to the movable support plate 182.

A brake 226 is connected to the vertical drive belt 224. The brake 226 is electronically actuated such that it is in a braking condition unless electrical power is supplied to the brake 226 to release it. This condition can be considered a fail safe condition such that the brake 226 will engage if power is shut off to the vertical drive mechanism 217.

The brake 226 prohibits gravity from driving the carriage 120 and movable support plate 182 to overdrive the vertical drive motor 220. The brake 226 provides a fail-safe backup to insure that the carriage 120 maintains its position when not in use and also to insure that the weight of the carriage 120 does not overdrive the vertical drive motor 220 and hit the motion limit stop 208 (FIG. 16) mounted on the lower support plate 192.

A 180 ounce-inch stepper motor has been found suitable for the vertical drive motor 220. A 5.14:1 gear reduction has been found suitable for the vertical drive train 222. The result is a vertical movement of 0.0047 inches of carriage 120 for each step of vertical drive motor 220.

Still referring to FIGS. 14 and 16, in order to minimize the vibration caused by vertical movement of the carriage 120 and movable support plate 182, a counterweight 230 is used. The counterweight 230 is supported so as to be vertically movable along the third mounting rod 198 which is attached to the third support member 188. An anti-rotation rod 232, substantially parallel to the third mounting rod 198 is slidably connected to, and guides the counter weight 230. The anti-rotation rod 232 is mounted between the lower support plate 192 and the upper support plate 190, and serves to restrain rotation of the counterweight 230.

The counterweight 230 moves vertically to offset or counter the weight of the carriage 120 and the associated drive mechanism so that the center of gravity of the counterweight 230 and the carriage 120 and movable support plate 182 is essentially constant and located at approximately the midpoint between the upper support plate 190 and the lower support plate 192.

In order to provide horizontal movement of the carriage 120, the entire carriage 120, moveable support plate 182, and movable support structure 181 are horizontally translated by a pulley-cable drive system 234 as shown in FIG. 1. FIG. 17 schematically illustrates this cable drive arrangement. Referring to FIGS. 1, 14, 16 and 17, but primarily FIG. 17, one end of a first cable 236 is resiliently attached at first attachment point 238 which is on frame 22 at approximately the same height or level as the top support plate 182. The resilient attachment is provided by a spring 239 which provides a constant tension to the cable drive system 234. A spring 239 inducing a tension of 42 pounds has been found suitable.

The first cable 236 passes through a first upper pulley 240 mounted on the upper support plate 190 of the movable support structure 181. The first cable 236 then passes through a first lower pulley 242 which is mounted on the lower support plate 192 of the movable support structure 181. The first upper pulley 240 and first lower pulley 242 are located substantially one above another. The first cable 236 then passes through a lower fixed pulley 244 which is mounted on the frame 22 substantially below the first attachment point 238 on the frame 22. The first cable 236 then extends the length of the frame 22, passing underneath the movable support structure 181, and terminating as it is wound around ad connected to a drive capstan 246. The drive capstan 246 is attached at the bottom of the frame 22 at the corner of the frame 22 opposite the lower fixed pulley 244.

It is possible to use one continuous cable, but the device of this invention uses a second cable 248 which has one end connected to the drive capstan 246. This second cable 246 passes through a second lower pulley 250 which is mounted on the lower support plate 192 of the movable support structure 181, adjacent the first lower pulley 242. The second cable 248 extends vertically upward until it passes through a second upper pulley 252 which is mounted on the upper support plate 190 on the movable support structure 181, adjacent the first upper pulley 240. The second upper pulley 252 is located substantially above the second lower pulley 250. The second cable 248 then extends horizontally along frame 22 to a second attachment point 254 on the side of the frame 22. The second attachment point 254 is substantially horizontal with the first attachment point 238, but on opposite sides of the frame 22. The second attachment point 254 is located substantially above the drive capstan 246.

In operation, a horizontal drive motor 256 (FIG. 1) rotates the drive capstan 246 (FIG. 17) through a horizontal drive train (not shown). Rotation of the drive capstan 246 causes one of the first or second cables 236 or 248 respectively, to be shortened, while the other of the first or second cables 236 or 248 is lengthened by the same amount as the previous cable was shortened. The result is that one of the first or second cables 236 or 248 respectively, exerts a horizontal force on the first or second upper and lower pulleys 240, 252, 242 and 250, thus causing the movable support structure 181 to move horizontally.

A 180 ounce inch stepper motor, has been found suitable for use as the horizontal drive motor 256. This stepper motor is used in conjunction with a 5.14:1 gear reduction in the horizontal drive train (not shown) to provide a horizontal translation of the carriage 30 of 0.0024 inches per step.

This pulley arrangement minimizes tilting of the movable support structure 181. As shown in FIG. 14, the first and second upper pulleys 240 and 252, respectively are placed on substantially the same horizontal plane. The same is done with the first and second lower pulleys 242 and 250, respectively (FIG. 16). This arrangement minimizes the possibility of the first and second cables 236 and 248, respectively, exerting unequal forces on the movable support structure 181, as would cause tilting or cocking of the support structure. The use of a continuous cable, or an effective continuous cable also minimizes this cocking since helps it insure that the same force is exerted in the first and second cables 236 and 248, respectively.

Referring to FIG. 16, the movable support structure 181 is movably supported to allow horizontal motion, as described hereinafter. During the horizontal movement, the movable support structure 181 travels or rides on a lower mounting rod 260. The lower mounting rod 260 is attached to a lower support member 262. Both the lower mounting rod 260 and the lower support member 262 are supported from, and extend substantially the length of the frame 22 (FIG. 1).

A pair of axially spaced apart, horizontal low friction couplings 264a and b, such as the linear bearings previously described, are mounted on the bottom surface of the lower support plate 192. These horizontal low friction couplings 264 ride on the lower mounting rod 260 so as to provide a low frictions support and guide for the lower support plate 192 of the movable support structure 181.

FIG. 14 shows an upper mounting rod 266 which is attached to an upper support member 268, both of which are supported from, and extend the length of the frame 22. The upper mounting rod 266 is substantially parallel to the lower mounting rod 260, but is located at the top of the frame 22, at the top of the storage slots 24 (FIG. 1). The upper mounting rod 266 and the upper support member 268 also serve to guide the movable support structure 181 as it travels horizontally.

FIG. 1 shows two pairs of upper low friction rollers 270 and 272 such as the ball bearing rollers previously described, are mounted to the top surface of the upper support plate 190. The upper pair of low friction rollers 270 are placed such that the rollers 270a and b are placed immediately adjacent one another, but on opposite sides of the upper mounting rod 266. One of these rollers 270a or b is resiliently urged against the upper mounting rod 266 by a tension spring (not shown) while the other roller 270b, is fixedly connected to the upper support plate 190. The second pair of upper low friction rollers 272a and b are both fixedly mounted to the upper support plate 190, so as to be adjacent one another but on opposite sides of the upper mounting rod 266. The upper low friction rollers 272a and b have a slight clearance with respect to the upper mounting rod 266 so they contact the upper mounting rod 266 only if the motion of the upper support plate 190 exceeds the clearance.

Referring generally to FIG. 1, the horizontal low friction couplings 264 (FIG. 16) and the upper low friction rollers 270 and 272 (FIG. 1) cooperate with one another to constrain the movable support structure 181 in a statically determinate manner analogous to that achieved by the upper and lower low friction couplings 200 and the bearing mounted wheels 202 on the movable support plate 182. The horizontal low friction couplings 264 react all translational motions except for motion along the lower mounting rod 260. The horizontal low friction couplings 264 also react all rotations except for rotation about the longitudinal axis of the lower mounting rod 260. The upper low friction rollers 270 and 272 react rotations about the axis of the lower mounting rod 260. The second pair of upper low friction rollers 272 also serve to restrain rotation about the vertical axis, after sufficient rotation occurs to take up the clearance between the rollers 272 and the upper mounting rod 266. There is thus provided a statically determinate support for the movable support structure 181 which reacts all forces except for those along the desired direction of travel, which is the horizontal direction in this particular case.

Referring to FIG. 1, the use of the counterweight 230 to effectively maintain the center of gravity of the movable support structure 181 in one location also facilitates horizontal movement of the movable support structure 181. The use of the pulley-cable drive system 234 effectively results in a horizontal translational force being applied at the vertical center of the movable support structure 181. If the carriage 120 is counterweighted then this horizontal translational force is effectively applied at the center of gravity of the movable support structure 181 and all components mounted on the movable support structure, such as carriage 120. If the carriage 120 is not counterweighted, then this horizontal force is applied at a distance from the center of gravity of the movable support structure 181, and an overturning moment results which must be reacted by the horizontal low friction couplings 264 (FIG. 16). This overturning moment can result in intermittent binding or sticking of the horizontal low friction couplings 264 as the movable support structure 181 is translated.

Referring to FIG. 16, motion limiting stops and limit sensors are also provided to prevent the movable support structure 181, or the carriage 120, from hitting any obstructions such as frame 27. Spring loaded motion limiting stops 274 are located adjacent each end of the lower mounting rod 260, so that if the movable support structure 181 is driven past its normal limits, the movable support structure 181 will not come to a sudden impact with the frame 22, but will rather be forced to a more gradual stop by being forced against the spring 276 in the spring loaded motion limiting stop 274. In order to prevent cocking of the movable support structure 181, as would occur if only one spring loaded motion limiting stop 274 were used, there are four motion limiting stops 274 (only one is shown), one each being located adjacent the ends of the lower mounting rod 260 and the upper mounting rod 266.

Infrared horizontal limit sensors 261, as previously described, are also used to signal computer 36 when the movable support structure 181 reaches its motion limits. The horizontal limit sensors 261 comprise a horizontal limit emitter 263 and a horizontal limit detector 265 between which passes an infrared beam which is interrupted by a projection (not shown) on the lower support plate 192 to indicate the limit positions of the movable support structure 181.

Figure 19:
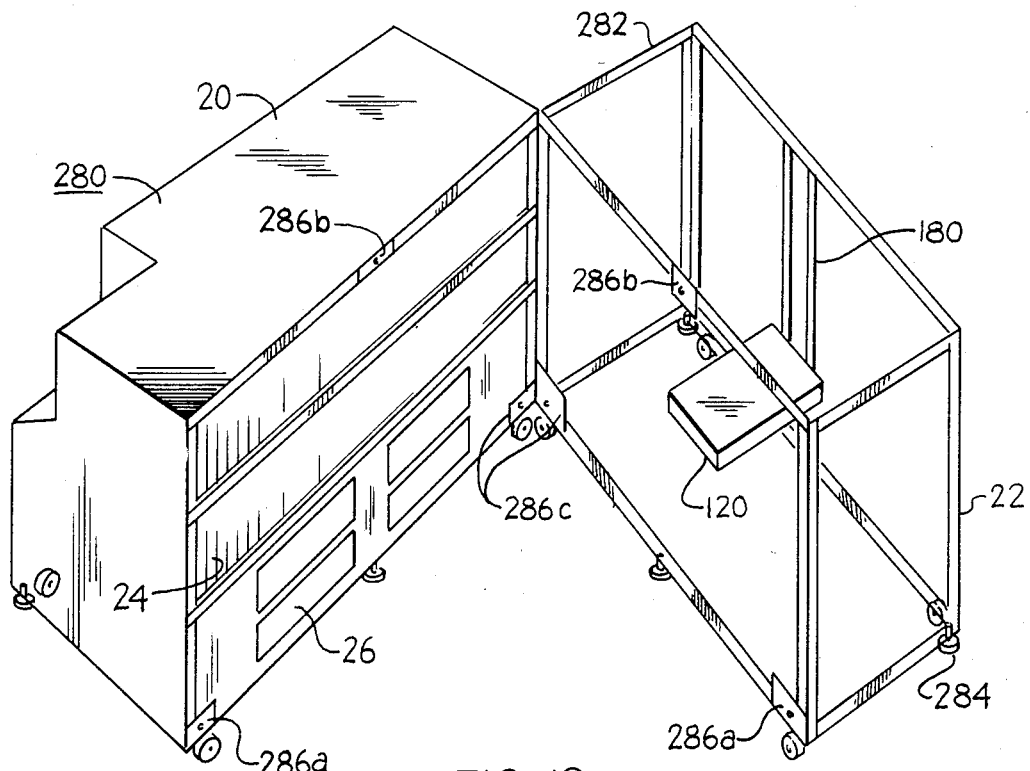
FIG. 19 is a perspective view showing the two halves of the optical storage and retrieval system as separated after shipment.

FIG. 19 shows how the optical storage and retrieval system 20 is shipped or transported. In order to reduce the size of the optical storage and retrieval system 20 for shipping and transportation, the system is shipped in two parts and assembled into one functional unit at its location of use. Each of the two parts is approximately 28 inches wide so that the two parts can fit through a standard doorway. The length and height of the two parts will depend upon the number of optical scanners 26 and storage slots 24 which are to be used. It has been found that four optical scanners 26 and 64 optical storage slots 24 can be placed in the operational half 280 of frame 22 having a width of 28 inches, a height of 56 inches, and a length of 64 inches. A comparably dimensioned transport half 282 of frame 22 contains the carriage 120, and the carriage transport mechanism 180.

When the operational half 280 and transport half 282 of frame 22 have been shipped to the operational location, they are joined at three attachment points 286a, b and c. The three attachment locations 286a, b and c, one each located at the top center, and two lower corners of the adjacent frames on both the operational half 280 and transport half 282 of frame 22, provide a three point planar attachment to minimize the distortion of the frame 22 when the operational half 280 is connected to the transport half 282 at the location of use. Diverse fastening means such as bolts and nuts can be used at the attachment locations 286 in order to connect the two halves of the frame 22 into a single unit.

Adjustable feet 284 are located at each of the four exterior corners of the optical storage and retrieval system 20. One additional adjustable foot 284 is located at the center of the optical storage and retrieval system 20 on the transport half 282 of frame 22. These adjustable feet 284 can be used to level and correctly position the two halves of the frame 22 prior to assembly, and to accommodate any variations in the contour of the floor on which the optical storage and retrieval system 20 is to be placed.

After the operational half 280 is joined to the transport half 282 and the adjustable feet 284 are used to minimize the distortion introduced into the frame 22, the carriage transport system 180 is ready to be aligned or calibrated. FIG. 18 shows the alignment or calibration as described hereinafter. Briefly stated, the location of optically perceptible targets associated with each storage slot 24, the input/output slot 54, and the optical scanner input/output slots 27, are determined and stored in the computer 36 (FIG. 3) so that the carriage transport mechanism 180 and the carriage 120 can be positioned in the correct orientation and location on command.

FIG. 18 shows upper and lower alignment slots 288a and b, respectively in frame 22. A reflective surface 290 is placed behind, and is viewable through alignment slots 288. The upper alignment slot 288a is located adjacent to, but to one side of, and above the storage slots 24. The lower alignment slot 288b is located directly below the upper alignment slot 288a, but to one side of and below the bottom of storage slots 24. An infrared sensor reflects and infrared beam off of this reflective surface 290 in order to orient the carriage 120 as described hereinafter.

The vertical and horizontal location of the alignment slots 288 with respect to frame 22 is stored in nonvolatile computer memory in computer 36 (FIG. 3). The carriage 120 has a reference location which is also stored in non-volatile computer memory. The location of the alignment slots 288 with respect to the reference location of the carriage 120 is thus stored in the computer 36. The reference location is reached by slowly moving the vertical and horizontal carriage transport mechanisms to the lower left corner of the optical storage and retrieval system 20, as determined when facing the storage slots 24 which are accessible by the carriage 120. The reference location is reached when the vertical limit sensor 206 indicates the carriage 120 is just at its lowest limit of travel, and when the horizontal limit sensor 161 indicates the carriage 120 is just at its left most limit of travel.

The carriage 120 is sent to its reference location and then directed to move to the location of the upper alignment slot 288a which is stored in the computer 36. When the carriage 120 reaches the stored memory location of the alignment slot 288, the slot full sensor 96 and the alignment sensor 72 (FIG. 1), on opposite sides of the latching end 124 of carriage 120, should be aligned with the alignment slots 288 if the carriage 120 is correctly positioned and orientated with respect to the alignment slots 288.

Figure 23:
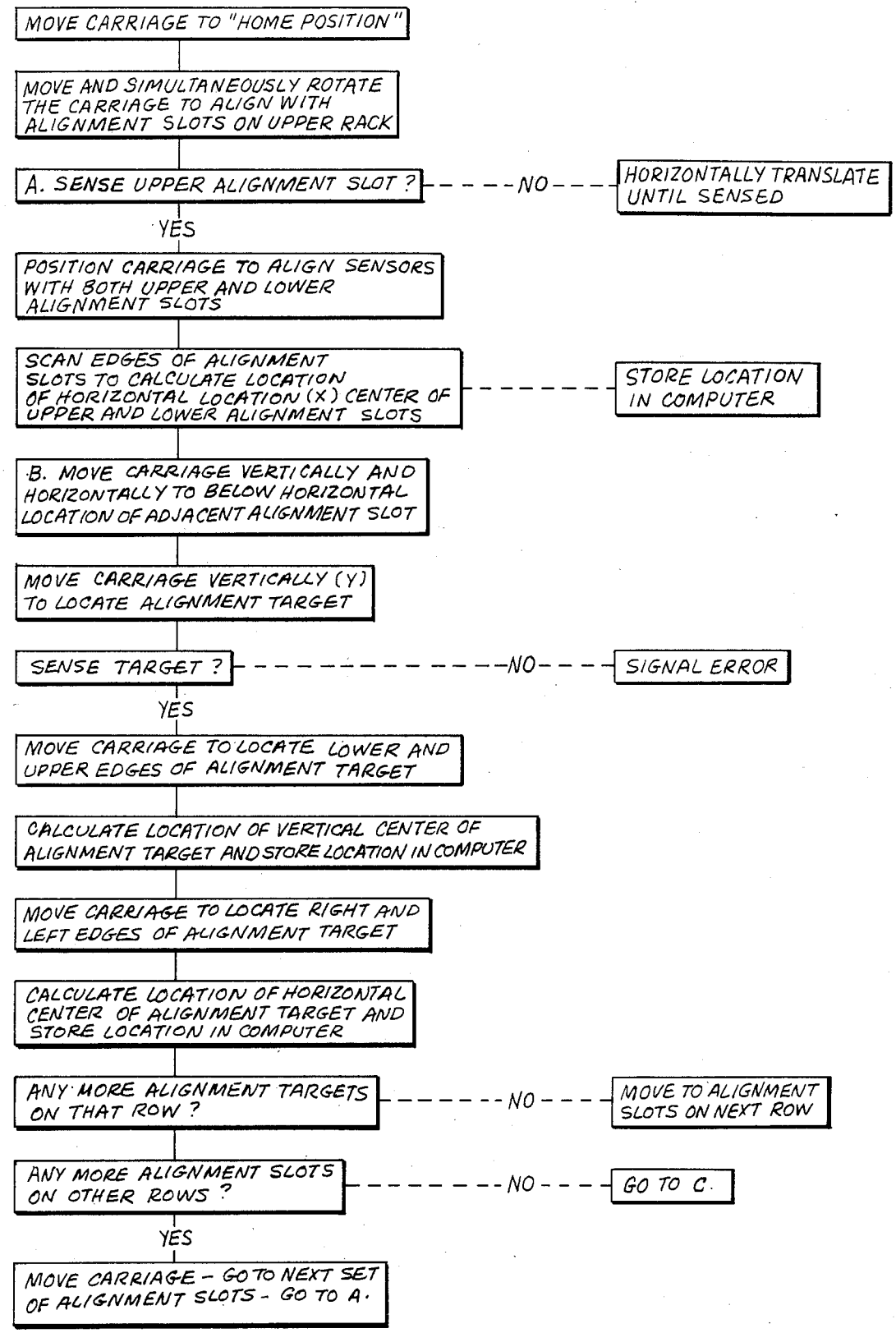
FIG. 23 is a flow chart of the sequence for aligning or calibrating the sensor targets on the storage slots of this invention.

Referring to FIGS. 1, 18 and 23, a typical alignment or calibration sequence for the input/output slot 54 and the storage slots 24 would be to orient the carriage 120 in a near vertical orientation so that the slot full sensor 96 is slightly closer to alignment slot 288a than alignment sensor 72 is to alignment slot 288b. The alignment sensor 72 and the slot full sensor 96 function in a manner previously described to reflect an infrared beam off of the reflective surface 290 in alignment slots 288 in order to verify the position and orientation of the carriage 120 and of the alignment slots 288. If the upper alignment slot 288a is not immediately located by the slot full sensor 96, then the carriage 120 is incrementally translated in a horizontal direction until the slot full sensor 96 detects the upper alignment slot 288a. The upper and lower alignment slots 288a and b are vertically orientated to facilitate this initial location by the slot full sensor 96. The carriage 120 is then rotated, and if necessary horizontally translated, until both the upper slot full sensor 96 and the lower alignment sensor 72 have located the alignment slots 288a and b.

The carriage 120 is then horizontally translated until the alignment sensor 72 locates the opposite, or left edge or side 294b of the lower alignment slot 288b, and until the slot full sensor 96 locates the opposite or left edge or side 294a of the upper alignment slot 288a the location of the lower alignment slot 288b, and the left edge 294b and right edge 292b of the lower alignment slot 288b are fed into the computer 36. The computer 36 then calculates the center of the lower alignment slot 288b. The location of the center of the upper alignment slot 288a is similarly calculated and these two calculated values are used to calculate the position that carriage 120 must be rotated to bring slot full sensor 96 and alignment sensor 72 into alignment with the centers of alignment slots 288 a and b respectively. This position is then stored in non-volatile computer memory in computer 36.

Below the center of each of the storage slots 24 and the input/output slot 54, is located an alignment target 80. This location is updated with respect to the newly determined location of the lower alignment slot 288b. To locate the adjacent alignment target 80a, the carriage 120 is vertically lowered so that the alignment sensor 72 is positioned below the center of the loser alignment slot 288b. The carriage 120 is then moved horizontally to the predetermined location of the adjacent alignment target 80a. The carriage 120 is then moved vertically or scanned until the alignment sensor 72 detects the lower edge and upper edge of the adjacent alignment target 80a.

The position of the vertical center of the alignment target 80a is then calculated and stored in non-volatile computer memory in computer 36. The carriage 120 is then positioned at the vertical center of the alignment target 80a but slightly to the left of the alignment target 80a. The carriage 120 is then moved or scanned horizontally until the alignment sensor 72 detects both the left edge and right edge of alignment target 80a. The position of the horizontal center of alignment target 80a is then then calculated and stored in non-volatile computer memory in computer 36.

The above sequence is then repeated for each of the alignment targets 80,. There is an alignment target 80 associated with each of the storage slots 24, and with the input/output slot 54.

The alignment or calibration sequence is performed for each row or rack of storage slots 24. Thus, after the location of each alignment target 80 and thus the location of each corresponding storage slot 24 in upper rack 23 of storage slots 24 has been determined and stored in computer 36, a similar sequence is repeated for the location of the alignment slots 288 and alignment targets 80 on the second row or lower rack 25 of storage slots 24. Following the storage of the locations of the alignment targets 80, and thus of the storage slots 24 in the second rack 25 of storage slots 24, the carriage 120 is rotated to the horizontal position and an analogous sequence is repeated for the horizontally oriented optical scanner input/output slots 27 on the optical scanners 26.

As shown in FIG. 18 there are comparable alignment slots 302, alignments targets 304 and slot full targets 306 on the optical scanners 26, except that these scanner alignment slots 302 and targets 304 and 306 are oriented horizontally in order to correspond with the horizontal orientation of the optical scanner input/output slots 27.

For example, below, but to the right and left sides of the optical scanner input/output slot 27, are located right and left alignment slots 302a and b, respectively. An alignment target 304 is located at the center of, but to the left of the optical scanner input/output slot 27. A slot full aperture 306 is located at the center of, but to the right of optical scanner input/output slot 27. The slot full aperture 306 on the optical scanner 26 is used for alignment purposes only since a sensor internal to the optical scanner 26 senses whether a cartridge 30 is present or not.

Figure 24:
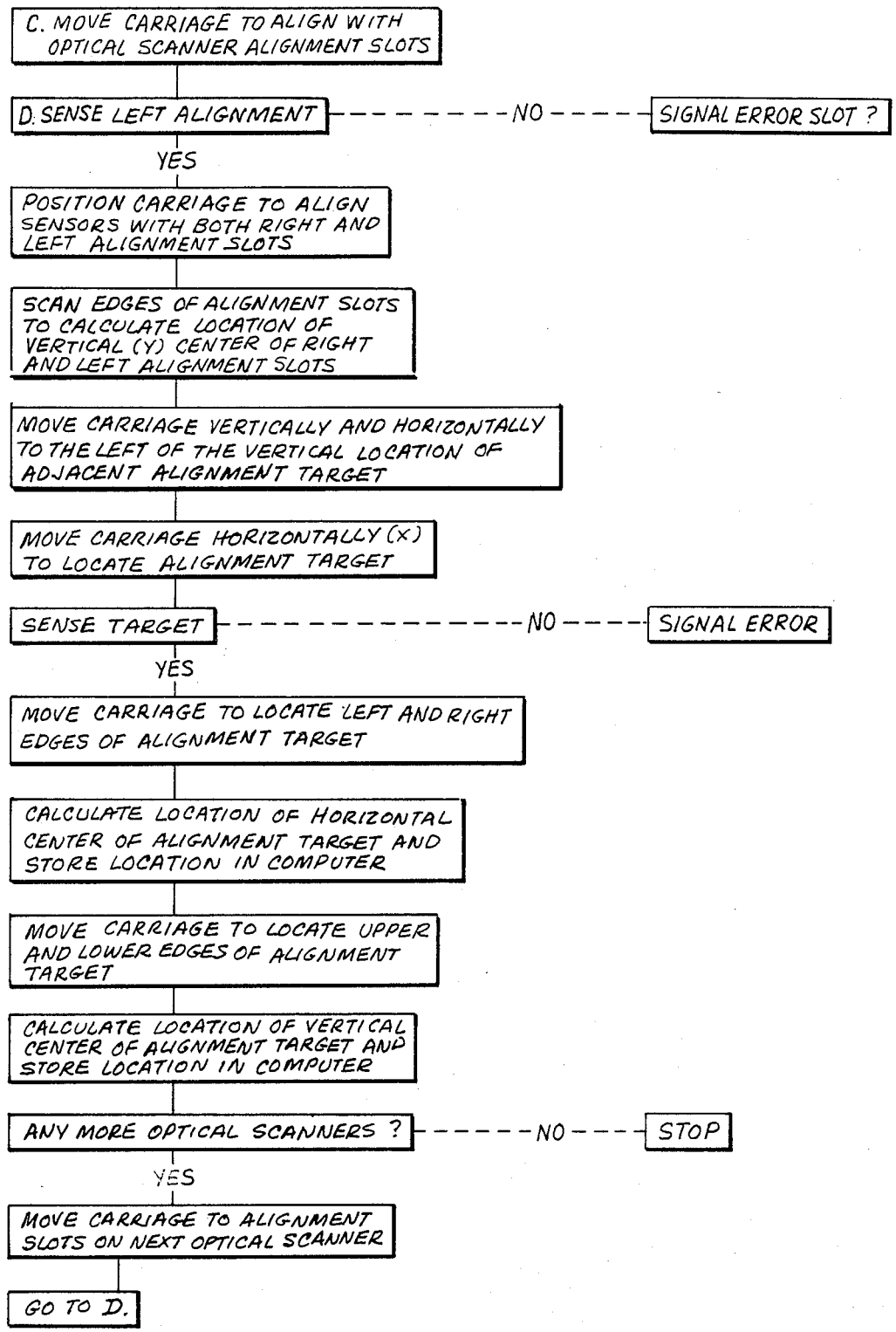
FIG. 24 is a flow chart of the sequence for aligning or calibrating the alignment targets of the optical scanners of this invention.

Referring to FIGS. 18 and 24, the carriage 120 is positioned at the predetermined location of the right and left alignment slots 302a and b respectively. If necessary, the carriage 120 is vertically translated or rotated in order to align the slot full sensor 96 and the alignment sensor 72 with the right and left alignment slots 302a and b respectively. After determining the central location of the right and left alignment slots 302a and b respectively, the carriage 120 is positioned so that the alignment sensor 72 is located to the left of the left alignment slot 302b. The carriage 120 is then moved vertically until it is at the predetermined location of the scanner alignment target 304 located to the left center of the optical scanner input/output slot 27. The carriage 120 is then moved or scanned horizontally until the alignment sensor 72 (FIG. 1) detects both the left edge and the right edge of the scanner alignment target 304. The position of the horizontal center of the scanner alignment target 304 is then calculated and stored in a non-volatile computer memory in computer 36. The carriage 120 is then positioned at the horizontal center of the scanner alignment target 304, but slightly below the bottom center of the scanner alignment target 304. The carriage 120 is then moved or scanned vertically until the alignment sensor 72 detects both the bottom edge and the top edge of the scanner alignment target 304. The position of the vertical center of the scanner alignment target 304 is then calculated and stored in non-volatile computer memory in computer 36.

In an analogous manner, the location of the optical scanner input/output slots 27 on the other optical scanners 26 are also determined. If the alignment sensors 72 on the carriage 120 are not able to locate the scanner alignment slots 302 on an optical scanner 26, then the computer 36 stores in its memory that there is no optical scanner 26 at that particular location.

The entire alignment sequence can be completed in a relatively short period of time. The alignment locations are updated or calibrated on a periodic basis. A weekly calibration is believed preferable and takes about ten minutes to complete.

The correct and accurate positioning of the carriage 120 can be achieved by the use of stepper motors which rotate the motor output shaft in predetermined steps or increments rather than in a continuous analog fashion as with conventional electric motors. Thus it is possible to store the location of the various storage slots 24, input-/output slot 54, and scanner input/output slots 27, in terms of the number of steps which must be taken by a particular motor, rather than by storing the absolute distance measurements and coordinates of each particular storage slot 24, or constantly determining the absolute position and orientation of carriage 120. Similarly, repositioning of carriage 120 can be done by commanding a particular stepper motor to move a fixed number of steps, rather than constantly measuring the relative positions of the carriage 120 and the slot 24 to which the carriage 120 is being sent.

The computer control of the optical storage and retrieval system 20 is divided between the computer 36 internal to the optical storage and retrieval system 20, and between a remote computer 310 (FIG. 1). The remote computer 310 keeps track of what data is stored in which cartridge 30, and where the particular cartridge 30 is presently located within the optical storage and retrieval system 20. The computer 36 internal to the optical storage and retrieval system 20 controls the manipulation of the cartridges 30 once the remote computer 310 tells the computer 36 which cartridge 30 is to be placed in a particular slot 24, input/output slot 54, or optical scanner 26 to go to. Thus, the computer 36 controls such components as the various limit sensors, the first and second gripper mechanisms 128 and 130, and the vertical, horizontal and rotational position of the carriage 120. The remote computer 310 on the other hand, makes the decision as to which cartridge 30 should be manipulated by the optical storage and retrieval system 20.

I claim:

1. A method of moving video disk cartridges, the cartridges being contained in a plurality of containing apertures, an alignment target being placed adjacent to, and associated with a number of said apertures, said cartridges having an engaging aperture at an edge of said cartridge, comprising:

locating the position of each of said alignment targets with respect to a reference position to locate the position of each of said containing apertures associated with said alignment targets;

storing information locating said alignment target positions in a computer;

positioning a rotatable transport carriage at the alignment target position stored in said computer memory for a first of said containing apertures, said first aperture containing a cartridge therein;

verifying the alignment of said rotatable transport carriage by sensing said alignment target adjacent said first aperture, and if not sensed, incrementally repositioning said rotatable transport carriage and sensing for said alignment target until said target is sensed and the alignment of said rotatable transport carriage is verified;

extending an engaging member from said rotatable transport carriage;

engaging said engaging aperture with said engaging member;

retracting said engaging member and the engaged cartridge into said rotatable transport carriage;

detecting when said engaging member and the engaged cartridge are retracted into said rotatable transport carriage a predetermined distance;

containing said cartridge in said rotatable transport carriage during transportation and rotation of said rotatable transport carriage and cartridge;

transporting and rotating said rotatable transport carriage and cartridge to the position of a second alignment target as stored in said computer;

verifying the alignment of said rotatable transport carriage by sensing said second alignment target, and if such verification is not sensed, incrementally repositioning said rotatable transport carriage and sensing for said alignment target, said repositioning and sensing being repeated until the location of said alignment target is verified; and extending said cartridge from said rotatable transport carriage.

2. A method of moving video disk cartridges as defined in claim 1, comprising the further step of:

disengaging said engaging member from said aperture before extending said object from said rotatable transport carriage.

3. A method of moving video disk cartridges as defined in claim 1, comprising the further step of:

disengaging said engaging member from said aperture after extending said cartridge from said rotatable transport carriage.

4. A method as defined in claim 1, comprising the further step of:

verifying that said cartridge is correctly positioned in said apertures by placing an optical emitter and an optical detector on opposite sides of a plurality of said apertures and cartidges, said optical emitter emitting a signal which passes through a hole in said cartridge and is detected by said optical detector when said cartridge is positioned so that the hole in said cartridge allows passage of said emitted signal so as to verify the position of said cartridge.

5. A method as defined in claim 1, wherein said transporting and rotating step further comprises:

transporting said rotatable transport carriage and cartridge in a plane defined by two mutually perpendicular axes, said rotation being about an axis substantially perpendicular to said plane; and wherein said retracting and extending steps occur along axes substantially perpendicular to said plane.

6. A method as defined in claim 1 wherein said retracting and extending steps occur along axes that are substantially parallel.

7. A method as defined in claim 1 wherein said retracting step moves said engaged cartridge along a retracting axis without said engaging member providing any substantial support to said cartridge and wherein said cartridge is extended from said carriage by moving said cartridge along an axis substantially parallel to said retracting axis, without said engaging member providing any substantial support to said cartridge.

8. A mechanism for manipulating video disk cartridges, said cartridges having an aperture in said cartridge, comprising:

a carriage which can be controllably rotated about an axis of rotation;

a positioning mechanism to controllably position said carriage in a plane substantially perpendicular to said axis of rotation;

an engaging member controllably engaging and disengaging said aperture in said cartridges to engage and disengage one of said cartridges;

a retraction and extension mechanism on said carriage for controllably extending and retracting said engaging member in order to remove said engaged cartridge from and insert said engaged cartridge into, a predetermined containing aperture, said retraction and extension mechanism acting along an axis eccentric from, but substantially parallel to said axes of rotation;

a computer to control the timing, execution, and sequence of manipulating said cartridges, to position and rotate said carriage so as to controllably extend and retract said engaging member to engage and disengage a predetermined cartridge;

means for releasably holding said cartridges when said cartridges are not retracted in said carriage;

a plurality of alignment targets adjacent said holding means when said cartridges are not retracted in said carriage; and an alignment sensor on said carriage for sensing said alignment targets, said computer cooperating with said alignment sensor to controllably position said carriage relative to the location of said alignment targets so as to position said engaging member relative to said engaged cartridge.

9. A mechanism as defined in claim 8, wherein said engaging member comprises:

a first engaging member, retractably extendable from said carriage to releasably engage said aperture in said cartridge to engage said cartridge;

a second engaging member, retractably extendable from said carriage to releasably engage said aperture in said cartridge, said first and second engaging members not engaging the same cartridge simultaneously; and wherein said retraction and extension mechanism comprises:

a first and second retraction and extension mechanism to extend said first and second engaging members, respectively, a predetermined distance from said carriage, and to retract said first and second engaging members a predetermined distance into said carriage, said first and second engaging members being independently retracted and extended by said first and second retraction and extension mechanisms, respectively, in order to allow independent engagement and retraction of said cartridges.

10. A mechanism as defined in claim 9, further comprising:

first and second engaging and disengaging mechanisms to engage and disengage said first and second engaging members from said aperture in said cartridges when said first and second engaging members are at a predetermined distance with respect to said carriage.

11. A mechanism as defined in claim 9, further comprising:
   extension and retraction sensor means on said first and second extension and retraction mechanisms for sensing the position of said extension and retraction mechanisms when they are extended or retracted, said computer cooperating with said extension and retraction sensor means to position said first and second engaging members, and any engaged cartridges, at a predetermined position.

12. A mechanism as defined in claim 8, further comprising:
   limit sensor means on said positioning mechanism, and on said rotatable carriage for indicating when said positioning mechanism and said carriage are at predetermined limits of travel, said computer monitoring the position of said positioning mechanism through said limit sensor means.

13. A mechanism as defined in claim 8 wherein said engaging member does not substantially support the weight of said cartridge during insertion and removal of said cartridge from said slots.

14. A method of moving video disk cartridges comprising:
   placing a plurality of cartridges in a plane;
   locating at least one reference location in said plane;
   determining the position of said cartridges relative to said reference location and storing information locating said reference locations in a computer;
   placing an engaging aperture in said cartridges and placing a first of said cartridges in a first location;
   extending one of two independently operable engaging members from a rotatable transport carriage;
   engaging said aperture in said first cartridge with said extended engaging member in order to engage said first cartridge in said first location;
   moving said engaged first cartridge out of said first location and into said rotatable transport carriage, said rotatable transport carriage supporting said cartridge during transportation and rotation of said rotatable transport carriage;
   transporting and rotating said rotatable transport carriage and said cartridge to position and align said first cartridge with a second location;
   moving said first cartridge from said rotatable transport carriage into said second location;
   sensing said reference location after an interval of time by a sensor on said rotatable transport carriage so that said cartridge locations can be redetermined and restored in said computer; and
   controlling the timing, execution, and sequence of moving said cartridges by using said computer, including using said computer to control the steps of extending said engaging members to engage and move said cartridges into said rotatable transport carriage, controllably transporting and rotating said cartridge to the location of said second location according to information on said location stored in said computer, and controllably shoving said cartridge from said carriage.

15. A method as defined in claim 14, comprising the further step of:
   disengaging said engaging member from said aperture before slidably shoving said cartridge from said rotatable transport carriage.

16. A method as defined in claim 14, comprising the further step of:
   disengaging said engaging member from said aperture after slidably shoving said cartridge from said rotatable transport carriage.

17. A method as defined in caim 14, wherein said transporting and rotating step further comprises;
   transporting said rotatable transport carriage and cartridge in a plane defined by two mutually perpendicular axes, said rotation being about an axis substantially perpendicular to said plane; and
   wherein said moving steps occur along axes substantially perpendicular to said plane.

18. A mechanism for manipulating video disk cartridges comprising:
   computer means for containing information from which the position and orientation of a plurality of aperture locations can be determined and into which apertures said cartridges can be inserted, and for containing information on the placement of said cartridges, said aperture locations being determined relative to at least one reference location;
   rotatable carriage means for holding an engaged cartridge during transportion, and for orienting said engaged cartridge to align with the orientation of said aperture locations by rotating said engaged cartridge about an axis substantially perpendicular to the plane in which said engaged cartridge is transported, the timing, execution and sequence of said transportation and orientation being controlled by said computer;
   planar positioning means for transporting said carriage in a plane to access said aperture locations;
   position sensor means on said carriage cooperating with said reference location so that said computer can determine the position of said carriage relative to said reference location when said position sensor means detects said reference location, said computer updating the stored position of said reference location at intervals of time, said computer using the reference location to correctly position and orientate said cartridge at said aperture locations;
   planar positioning means for transporting said carriage in a plane to access said aperture locations;
   first and second extension and retraction gripper means in said carriage, acting along axes offset from, but substantially parallel to, the rotational axis of said carriage, for bringing said cartridges into said carriage, and for removing said cartridges from said carriage, the first extension and retraction means functioning independently of the second extension and retraction gripper means, said computer controlling the timing, sequence and operation of said first and second gripper means, each gripper means comprising:
   retractably extendable engaging means for retractably extending from said carriage to releasably engage an aperture in said engaged cartridge when said cartridge is in one of said aperture locations in order to retract said engaged cartridge into said carriage without said engaging means substantially supporting the weight of said engaged cartridge; and
   retractably extendable pushing means for removing said engaged cartridge from said carriage and placing it into one of said aperture locations when said carriage is aligned with the position and orientation of an aperture location into which said cartridge is to be placed, said engaging means not substantially supporting the weight of said engaged cartridge during removal.

19. A mechanism as defined in claim 18, further comprising:
engaging and disengaging means for engaging and disengaging said extension and retraction gripper means from said cartridges when said gripper means are at a predetermined distance from said carriage.

20. A mechanism as defined in claim 18, further comprising:
position sensor means for verifying that said gripper means are extended and retracted a predetermined distance with respect to said carriage, said computer monitoring said position sensor means in order to control and operate the timing and sequence of said gripper means.

21. A mechanism as defined in claim 18 wherein said engaging means does not substantially support the weight of said cartridge during retraction of said cartridge into said carriage.

22. A mechanism as defined in claim 18 wherein said planar positioning means positions said carriage in a plance defined by a substantially vertical and a substantially horizontal axis.

23. A mechanism as defined in caim 18 wherein said positioning means positions said carriage in a plane defined by a substantially vertical and a substantially horizontal axis, and wherein said carriage rotates about a substantially horizontal axis.

24. A mechanism as defined in claim 18 wherein said carriage is cantilevered from said positioning means.

25. A mechanism for manipulating video disk cartridges, wherein said cartridges have at least one aperture in one surface of said cartridge, comprising:
a carriage;
rotation means connected to said carriage for rotatably positioning said carriage about a rotatable axis;
first and second, independently operable, gripping means supported by said carriage, for releasably gripping said apertures in said cartridges to controllably engage and release said cartridges said gripping means not supporting the weight of said cartridges;
retraction and extension means for independently and controllably extending and retracting said first and second gripping means a predetermined distance with respect to said carriage so as to remove said cartridges from, and insert said cartridges into, containing apertures, said means acting along an axis eccentric from, but substantially parallel to, said rotatable axis;
positioning means for positioning said carriage in a plane substantially perpendicular to said rotatable axis of said carriage said carriage being cantilevered from said positioning means;
sensor means on said carriage for determining the amount which said retention and extension means extend and retract said gripping means with respect to said carriage;
control means for controlling the timing, execution, and sequence of said gripping means, retraction and extension means, rotation means, positioning means, and sensor means.

* * * * *